US011443473B2

(12) United States Patent
Choi

(10) Patent No.: US 11,443,473 B2
(45) Date of Patent: *Sep. 13, 2022

(54) SYSTEMS AND METHODS FOR GENERATING A SKULL SURFACE FOR COMPUTER ANIMATION

(71) Applicant: Weta Digital Limited, Wellington (NZ)

(72) Inventor: Byung Kuk Choi, Wellington (NZ)

(73) Assignee: Unity Technologies SF, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/347,437

(22) Filed: Jun. 14, 2021

(65) Prior Publication Data
US 2022/0092840 A1  Mar. 24, 2022

Related U.S. Application Data

(63) Continuation of application No. 17/153,733, filed on Jan. 20, 2021, now Pat. No. 11,055,892, which is a
(Continued)

(51) Int. Cl.
*G06T 13/40* (2011.01)
*G06T 17/00* (2006.01)
(Continued)

(52) U.S. Cl.
CPC .............. *G06T 13/40* (2013.01); *G06F 16/53* (2019.01); *G06N 3/08* (2013.01); *G06N 20/00* (2019.01);
(Continued)

(58) Field of Classification Search
CPC .......... G06T 7/50; G06T 13/40; G06T 17/00; G06T 19/00; G06T 2200/24;
(Continued)

(56) References Cited

U.S. PATENT DOCUMENTS 5,813,984 A   9/1998 Haaga et al.
6,556,196 B1  4/2003 Blanz et al.
(Continued)

OTHER PUBLICATIONS

Kähler et al., "Geometry-based Muscle Modeling for Facial Animation", Max-Planck-Institut für Informatik, Stuhlsatzenhausweg 85, 66123 Saarbröucken, Germany, 2001 (Year: 2001).*
(Continued)

*Primary Examiner* — Diane M Wills
(74) *Attorney, Agent, or Firm* — Haynes & Boone LLP

(57) ABSTRACT

An animation system wherein a machine learning model is adopted to generate animated facial actions based on parameters obtained from a live actor. Specifically, the anatomical structure such as a facial muscle topology and a skull surface that are specific to the live actor may be used. A skull surface that is specific to a live actor based on facial scans of the live actor and generic tissue depth data. For example, the facial scans of the live actor may provide a skin surface topology of the live actor, based on which the skull surface underneath the skin surface can be derived by "offsetting" the skin surface with corresponding soft tissue depth at different sampled points on the skin surface.

17 Claims, 13 Drawing Sheets

Related U.S. Application Data continuation of application No. 17/079,078, filed on Oct. 23, 2020.

(60) Provisional application No. 63/084,184, filed on Sep. 28, 2020, provisional application No. 63/080,468, filed on Sep. 18, 2020.

(51) Int. Cl.
| | |
|---|---|
| *G06F 16/53* | (2019.01) |
| *G06T 7/50* | (2017.01) |
| *G06N 3/08* | (2006.01) |
| *G06N 20/00* | (2019.01) |
| *G06T 15/20* | (2011.01) |
| *G06T 17/20* | (2006.01) |
| *G06V 40/16* | (2022.01) |

(52) U.S. Cl.
CPC .............. *G06T 7/50* (2017.01); *G06T 15/205* (2013.01); *G06T 17/00* (2013.01); *G06T 17/20* (2013.01); *G06V 40/165* (2022.01); *G06V 40/171* (2022.01); *G06V 40/174* (2022.01); *G06T 2200/24* (2013.01); *G06T 2207/20081* (2013.01); *G06T 2207/20084* (2013.01); *G06T 2207/30201* (2013.01); *G06T 2215/16* (2013.01)

(58) Field of Classification Search
CPC . G06T 2207/20081; G06T 2207/20084; G06T 2207/30196; G06T 2207/30201; G06N 3/08

See application file for complete search history.

(56) References Cited

U.S. PATENT DOCUMENTS

| | | | |
|---|---|---|---|
| 7,804,997 | B2 | 9/2010 | Geng et al. |
| 9,672,302 | B2 | 6/2017 | Dean et al. |
| 10,546,417 | B2 | 1/2020 | Black et al. |
| 10,755,465 | B2 | 8/2020 | Bullivant et al. |
| 2019/0035149 | A1* | 1/2019 | Chen ........................ G06T 7/50 |
| 2020/0226821 | A1 | 7/2020 | Ma, III et al. |
| 2020/0293796 | A1 | 9/2020 | Sajjadi et al. |
| 2020/0349752 | A1 | 11/2020 | Bullivant et al. |
| 2020/0388066 | A1 | 12/2020 | Miller, IV et al. |
| 2021/0012512 | A1 | 1/2021 | Beeler |
| 2021/0012549 | A1 | 1/2021 | Comer |
| 2021/0056746 | A1 | 2/2021 | Fang |
| 2021/0074004 | A1 | 3/2021 | Wang |

OTHER PUBLICATIONS

Nguyen et al., "A statistical shape modeling approach for predicting subject-specific human skull from head surface", International Federation for Medical and Biological Engineering, published online Jul. 25, 2020 (Year: 2020).*

Gruber A, Fratarcangeli M, Zoss G, Cattaneo R, Beeler T, Gross M, Bradley D. Interactive Sculpting of Digital Faces Using an Anatomical Modeling Paradigm. InComputer Graphics Forum Aug. 2020 (vol. 39, No. 5, pp. 93-102). (Year: 2020).*

Yi Cai, Yifan Guo, Haotian Jiang, Ming-Chun Huang, "Machine Learning Approaches for Recognizing Muscle Activities Involved in Facial Expressions Captured by Multi-Channels Surface Electromyogram," 2018, Smart Health 5-6, 15-25 (Year: 2018).

Shuyu Luo, "Loss Function (Part 111): Support Vector Machine," 2018, Towards Data Science, retrieved from "https://towardsdatascience.com/opti mization-loss-function-under-the-hood-part-i ii-5dff33fa015d" (Year: 2018).

M. Romeo and S.C. Schvartzman, "Data-Driven Facial Simulation," Aug. 2020, Computer Graphics Forum 39 (6) :513-526 (Year: 2020).

Kahler, Kolja, Jorg Haber, and Hans-Peter Seidel "Geometry-based muscle modeling for facial animation " Graphics Interface. vol. 2001. 2001. (Year: 2001).

Nguyen, Tan-Nhu, et al. "A statistical shape modeling approach for predicting subject-specific human skull from head surface." Medical & Biological Engineering & Computing 58.10 (2020): 2355-2373. (Year: 2020).

Sifakis E, Neverov I, Fedkiw R. Automatic determination of facial muscle activations from sparse motion capture marker data. InACM SIGGRAPH 2005 Papers Jul. 1, 2005 (pp. 417-425).

Krinidis S, Buciu I, Pitas I. Facial expression analysis and synthesis: A survey. In1 Olh International Conference on Human-Computer Interaction (HCI2003) Jun. 22, 2003 (pp. 22-27).

Kollias D, Cheng S, Ververas E, Kotsia I, Zafeiriou S. Deep neural network augmentation: Generating faces for affect analysis. International Journal of Computer Vision. Feb. 22, 2020:1-30.

Li H, Sun J, Xu Z, Chen L. Multimodal 2D+ 3D facial expression recognition with deep fusion convolutional neural network IEEE Transactions on Multimedia. Jun. 8, 2017;19(12):2816-31.

Zhen Q, Huang D, Wang Y, Chen L. Muscular movement model-based automatic 3D/4D facial expression recognition. IEEE Transactions on Multimedia. Apr. 20, 2016;18(7):1438-50.

Wu et al. "An Anatomically-Constrained Local Deformation Model for Monocular Face Capture", Disney Research and ETH Zurich, ACM Transactions in Computer Graphics, 2018, p. 1, 4, 5 (Year: 2018).

International Search Report and Written Opinion dated May 7, 2021 issued in PCT/NZ2020/050139 (12 pages).

Anonymous: "About Offsetting Surfaces: AutoCAD : Autodesk Knowledge Network", Jan. 12, 2018 (Jan. 12, 2018), pp. 1-6, XP055801901, Retrieved from the Internet: URL:https://knowledge.autodesk.com/support/autocad/learn-explore/caas/CloudHelp/cloudhelp/2018/ENU/AutoCAD-Core/files/GUID-FF0E6915-D80A-462E-B632-7D958A5CA7E5-htm.html [retrieved on May 6, 2021] p. 1-p. 2.

Lee Won-Joon et al: "Correlation Between Average Tissue Depth Data and Quantitative Accuracy of Forensic Craniofacial Reconstructions Measured by Geometric Surface Comparison Method", Journal of Forensic Sciences, vol. 60, No. 3, May 1, 2015 (May 1, 2015), pp. 572-580, XP055801842, Chicago, IL, US ISSN: 0022-1198, DOI: 10.1111/1556-4029.12726 abstract.

Nikolaos Ersotelos et al: "Building highly realistic facial modeling and animation: a survey", The Visual Computer; International Journal of Computer Graphics, Springer, Berlin, DE, vol. 24, No. 1, Sep. 22, 2007 (Sep. 22, 2007), pp. 13-30, XP019562394,ISSN: 1432-2315, DOI:10.1007/S00371-007-0175-Y abstract section 3 on face modeling.

Noh J-Y et al: "A Survey of Facial Modeling and Animation Techniques", Internet Citation, Jan. 1, 1999 (Jan. 1, 1999), XP002262770, Retrieved from the Internet: URL:http://graphics.usc.edu/cgit/pdf/paper s/survey.pdf [retrieved on Nov. 24, 2003] abstract figure 1 sections 5.2, 6, 6.2 on pseudo muscles.

International Search Report and Written Opinion dated Jun. 3, 2021 issued in PCT/NZ2020/050140 (12 pages).

Lee Seunghwan et al: Scalable muscle-actuated human simulation and control11 , ACM Transactions On Graphics, ACM, NY, US, vol. 38, No. 4, Jul. 12, 2019 (Jul. 12, 2019), pp. 1-13, XP058452122, ISSN: 0730-0301, DOI: 10.1145/3306346.3322972 abstract.

Masaki Nakada et al: Biomimetic eye modeling & deep neuromuscular oculomotor control 11 , ACM Transactions On Graphics, ACM, NY, US, vol. 38, No. 6, Nov. 8, 2019 (Nov. 8, 2019), pp. 1-14, XP058445789, ISSN: 0730-0301, DOI: 10.1145/3355089.3356558 abstract.

Sung-Hee Lee et al: "Heads up! Biomechanical Modeling and Neuromuscular Control of the Neck", ACM Transactions On Graphics, ACM, NY, US, vol. 25, No. 3, Jul. 2006 (Jul. 2006), pp. 1188-1198, XP058328219, ISSN: 0730-0301, DOI: 10.1145/1141911.1142013 abstract.

Salam Hanan et al: A survey on face modeling: building a bridge between face analysis and synthesis, Visual Computer, Springer, Berlin, DE, vol. 34, No. 2, Nov. 18, 2016 (Nov. 18, 2016), pp.

(56) References Cited

OTHER PUBLICATIONS 289-319, XP036391388, ISSN: 0178-2789, DOI: 10.1007/S00371-016-1332-Y [retrieved on Nov. 18, 2016] the whole document.

* cited by examiner

Muscle Model

| Muscle# | Bone Attachment Point for Muscle | Skin Attachment Point for Muscle | Muscle Volume (in cubic mm) |
|---|---|---|---|
| $M_1$ | $(x_1, y_1, z_1)$ | $(u_1, v_1)$ | $V_1$ |
| $M_2$ | $(x_2, y_2, z_2)$ | $(u_2, v_2)$ | $V_2$ |
| $M_3$ | $(x_3, y_3, z_3)$ | $(u_3, v_3)$ | $V_3$ |
| ... | ... | ... | ... |
| ... | ... | ... | ... |
| $M_N$ | $(x_N, y_N, z_N)$ | $(u_N, v_N)$ | $V_N$ |

| Joints | Description | Type of Value |
|---|---|---|
| J | Jaw | Angle |
| E.l | Left Eye | Rotation in 2D |
| E.r | Right Eye | Rotation in 2D |
| ... | ... | ... |

FIG. 3

Muscle Model

| Muscle# | Bone Attachment Point for Muscle | Skin Attachment Point for Muscle | Muscle Volume (in cubic mm) |
|---|---|---|---|
| $M_1$ | $(x_1, y_1, z_1)$ | $(u_1, v_1)$ | $V_1$ |
| $M_2$ | $(x_2, y_2, z_2)$ | $(u_2, v_2)$ | $V_2$ |
| $M_3$ | $(x_3, y_3, z_3)$ | $(u_3, v_3)$ | $V_3$ |
| ... | ... | ... | ... |
| ... | ... | ... | ... |
| $M_N$ | $(x_N, y_N, z_N)$ | $(u_N, v_N)$ | $V_N$ |

$(\text{curve\_start}, \text{curve\_end}, \text{curve\_length})_1$ $(\text{curve\_start}, \text{curve\_end}, \text{curve\_length})_2$ $\vdots$ $(\text{curve\_start}, \text{curve\_end}, \text{curve\_length})_n$

FIG. 7

SYSTEMS AND METHODS FOR GENERATING A SKULL SURFACE FOR COMPUTER ANIMATION

CROSS-REFERENCES TO PRIORITY AND RELATED APPLICATIONS

The present disclosure is a continuation application of and claims priority to U.S. nonprovisional application Ser. No. 17/153,733, filed on Jan. 20, 2021, which in turn is a continuation of and claims priority to U.S. nonprovisional application Ser. No. 17/079,078, filed on Oct. 23, 2020, which in turn is a nonprovisional of and claims priority to commonly-owned and co-pending U.S. Provisional Applications 63/080,468, filed on Sep. 18, 2020, and 63/084,184, filed on Sep. 28, 2020.

This application is related to commonly-owned and co-pending U.S. Nonprovisional application Ser. No. 17/079,058, (attorney docket no. 60152.62US01), filed on Oct. 23, 2020.

All of the above mentioned applications are hereby expressly incorporated by reference herein in their entirety.

FIELD OF THE INVENTION

The present disclosure generally relates to tools for generating computer-generated imagery. The disclosure relates more particularly to apparatus and techniques for generating muscle models usable by animators in creating computer-generated imagery.

BACKGROUND

Many industries generate or use computer-generated imagery, such as images or video sequences. The computer-generated imagery might include computer-animated characters that are based on live actors. For example, a feature film creator might want to generate a computer-animated character having facial expressions, movements, behaviors, etc. of a live actor, human or otherwise. It might be possible to have an animator specify, in detail, a surface of the live actor's body, but that can be difficult when dealing with facial expressions and movements of the live actor, as there are many variables.

Existing animation systems may recreate, in detail, a skin surface of the computer-animated character that closely resembles a live actor. To simulate the movements and/or facial expression of the computer-animated character that may appear to be similar to those of the live actor, muscle movements performed by the live actor is decomposed and analyzed, which often entails knowledge of an anatomical model of the physical body of the live actor. For example, the anatomical model may include the shape, mass, curvature, and/or other parameters that describe the structure of the muscle layer and the skull of the live actor.

The anatomical model can usually include a large number of variables. For example, there are more than 650 skeletal muscles in the human body, of which over 40 are controlled by seven nerves in a human face. Obtaining a geometric structure of the distribution of the large number of facial muscles can be challenging, and the vector representation of a high dimension to describe the facial muscle geometry may largely increase the complexity of computer animation.

SUMMARY

Embodiments described herein provide a computer-implemented method for generating a facial model of a live actor. A plurality of facial scans of the live actor are obtained. Each facial scan includes a respective skin surface and respective sensing data indicative of facial muscle strains corresponding to the respective skin surface. A tissue depth dataset is obtained, including a plurality of tissues depths corresponding to a plurality of tissue depth points on a human face. Each tissue depth indicates a distance from a corresponding tissue depth point on the human face to a skull surface underneath the human face. A three-dimensional ("3D") facial skin surface structure of the live actor is determined, from the plurality of facial scans. A skull surface is generated, from the three-dimensional facial skin surface structure and the tissue depth dataset.

In one embodiment, the determination from the plurality of facial scans, the three-dimensional facial skin surface structure of the live actor comprises: determining, for a sampled point on the three-dimensional facial skin surface structure, a corresponding point on a skull surface based on a respective tissue depth corresponding to the sampled point; and determining the skull surface by interpolating a plurality of determined corresponding points on the skull surface.

BRIEF DESCRIPTION OF THE DRAWINGS

Various embodiments in accordance with the present disclosure will be described with reference to the drawings, in which:

FIG. 3 illustrates an example of a data structure that might represent a muscle model, in an embodiment.

FIG. 7 provides an illustrative diagram showing reduction in the degree of freedom of the muscle topology data structure, according to one embodiment described herein.

DETAILED DESCRIPTION

Figure 1:
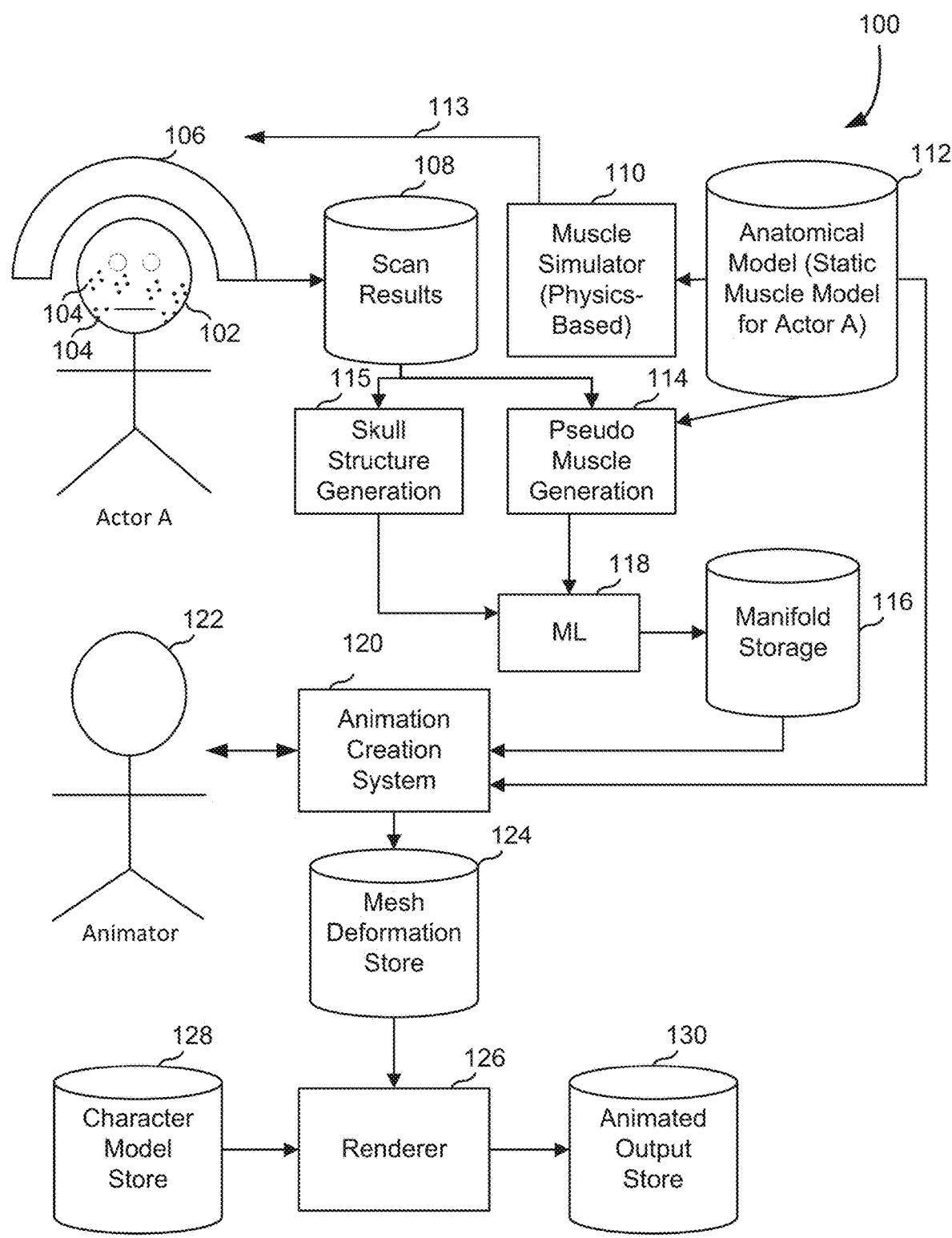
FIG. 1 illustrates an animation pipeline that might be used to render animated content showing animation of a character based on a machine learning model that is trained from scans of a live actor, according to one embodiment described herein.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Video applications nowadays may adopt computer-animated technology to create simulated characters, human or non-human, to appear a video. For example, the film industry has been using computer animation to generate characters that is often physically difficult or even impossible to be played by human actors. The physical appearance of such computer-animated characters may be designed and controlled by an animator, via configuring time-varying parameters to simulate the muscle, joint and bone structures and movements of a living creature, human or non-human. In this way, the computer-animated character may be created to emulate the persona of a real living creature.

As used herein, an animator may refer to a human artist, filmmaker, photography image creator, or the like, who seeks to generate one or more images (such as a video sequence forming an animation) based on animator input and other data available to the animator. In some embodiments, the animator might be an automated or partially automated process. Animator inputs might include specifications of values for positions of movable elements. For example, an articulated character's movement might be specified by values of each available joint in the character.

As used herein, a rig may refer to a representation of data that corresponds to elements of a character, the allowed movements, etc. One such rig is a facial rig. An animator might be provided with a user interface of an animation creation system that allows the animator to input values for various movable elements of the facial rig. Some movable elements might be a jaw and a collection of muscles. From a specification of provided variables of the movable elements of the facial rig, the animation creation system can generate a pose of the facial rig. For example, when variables corresponding to an amount of contraction for the muscles on either side of the mouth are set to values that represent maximum contraction of those muscles, the animation creation system would output a pose with a face having a widened mouth. By varying the variables from frame to frame, and thus changing poses from frame to frame, animation creation system can output positions of elements, thicknesses of elements, etc., which might be provided as input to a rendering system.

A state of a facial rig corresponding to a particular expression, movement, or placement of elements of the facial rig so as to convey an expression or positioning of facial elements might be represented in computer memory as a data structure such as a strain vector. A strain vector might have components representing jaw position, eye positions, and strain values for each muscle in the facial rig that can be specified by the strain vector. Thus, a particular expression of a live actor can be represented by a strain vector and that strain vector can be used to move or position elements of a facial rig—of that live actor, of a fanciful character, etc.—for generating computer-generated imagery. In some embodiments, the strain value components are one per muscle each having a value representing a present strain value for its corresponding muscle. A strain value might have a fixed value for a muscle in a neutral position for that muscle and a range of values covering contractions relative to the neutral position relaxations relative to the neutral position. In a very specific embodiment, a neutral position value for a strain is zero, a strain value for a muscle contracted relative to the neutral position is a negative number, and a strain value for a muscle relaxed relative to the neutral position is a positive number. The strain value in that specific embodiment might correspond to a length assigned to the muscle in the corresponding position.

Given that a facial rig might comprise a large number of muscles, manually and individually setting each muscle's strain value in the strain vector can be a tedious process and it can be hard to manually match the strain vector component values to a desired state or expression.

7In one embodiment, an animator can generate animation of a face of a character making an expression, perhaps talking according to certain speech, and moving around by inputting, or otherwise specifying or determining, a set of strains, wherein a strain is a metric of a muscle that can be moved. In an example, a strain of a muscle is represented as a numerical value where 0.0 corresponds to the muscle in a rest or default position, a positive number corresponds to muscle contraction and a negative number corresponds to muscle relaxation. For example, the numerical value for a strain, $S_M$, of a muscle, M, might be as expressed in Equation 1.

$$S_M = (\text{rest\_length}(M) - \text{length}(M))/\text{rest\_length}(M) \qquad \text{(Eqn. 1)}$$

A difficulty with animating a face is that there are a large number of facial muscles and specifying a strain for each can be tedious, especially where many scenes need to be created. Another difficulty is in creating a model for the facial rig, specifying where each muscle attaches to a skull and to skin, or some other facial feature. For an animated face to look right, it is often necessary that the strains correspond to actual strains in live actor muscles, but it is not practical to determine, even for one live actor, where each muscle connects on that actor's skull and skin, the thicknesses of the muscles, subdermal structures, etc. and thus the building of a model and a facial rig that correspond to a particular live actor. Yet another complexity is that there might be some expressions or animations that might be representable by a predetermined set of movements of a selected subset of muscles and if there are a large number of muscles in that subset, moving them in concert might be tedious.

In an embodiment described herein, expressions of an actor are determined for example, by scanning the actor's face to capture scanned data, which can identify how points on the surface of the actor's face move in three dimensions. A number of expressions can be scanned. While it is generally known which muscles are present in a face of a well-studies species, such as humans, there can be variability in where the muscles are attached, which are activated, where both ends are attached, their thicknesses, and what range of strains are possible. For example, a person with a "jowly" face would have different values for those than a person with a non-jowly face. As another example, there are some actors who are able to strain muscles (i.e., move them away from their rest positions) to cause their ears to wiggle and there are others who cannot strain those muscles. In some cases, the scanning or expression determination might be done on actors who are no longer living, perhaps from two-dimensional ("2D") or three-dimensional ("3D") recordings of the actor when alive.

An animation creation system and animators who use the animation creation system might want a model for a specific live actor, including their skull shape, muscle-to-skull attachment positions, muscle thicknesses, etc., to construct a facial rig that can be animated, but that might not be possible to determine directly from the live actor. One solution is to only rely on scanned expressions and the animator is permitted to create other expressions not directly scanned by specifying a linear combination of the available scans, but that is often constraining. The shape blending system might be treated as a rig that the animator can control by specifying blend shape weights, but for faces, this can be hard. Some results might be less than desirable as a human can create an almost infinite number of facial expressions and not all of those can be captured for blending.

In some embodiments, an AI system can generate a trained manifold based on inputs from the scan results, dynamic muscle activations, and an anatomical model. A physics-based muscle simulator might be used to generate dynamic muscle activations that are then consumed by the AI to produce a trained manifold. The anatomical model, for example, may include the muscle topology of the specific live actor, e.g., shape, length, position, distribution, mass, and/or the like, of the facial muscles, and the skull surface of the specific live actor, e.g., the shape, dimension, curvature parameters, and/or the like of the skull.

To build the muscle topology of the specific live actor, some existing systems may adopt live sensing data from the live actor—for instance, a number of fiducial markers (e.g., see 104 in FIG. 1) may be placed around the head area of the live actor to capture sensing data of the muscle position and movement. The distribution of the fiducial markers may be determined in reference to an anatomy book, e.g., a generic facial muscle distribution map. The capture sensing data relating to the facial muscles may then be used to build a muscle topology that is modeled as a polygon. The polygon facial muscle topology, however, can be overly complicated for data processing. For instance, the human face contains at least 43 muscles, and each of them may be described by multiple surfaces and edges, which eventually results in vector representations of the muscle topology in a high-dimensional space and significant computational burden on the machine learning engine.

In view of the need for a muscle topology for efficient machine learning, embodiments described herein generate a muscle structure of simplified "pseudo" muscles that approximate the actual muscle topology but with reduced degree of freedom. Specifically, instead of directly using a muscle polygon topology generated from sensing data corresponding to facial scans of the live actor, a subset of surfaces and/or edges of the muscle polygon topology are selected, as pseudo-muscles, to represent and approximate the muscle polygon topology. For example, each pseudo-muscle may appear in the form of a muscle curve, described by the tuple of curve start position, curve end position, and curve length. Thus, the changes of the curve start position, curve end position and/or the curve length may be used to denote the muscle strain value. As the number of muscle curves are much smaller than the variables required to describe a muscle polygon topology, the degree of freedom of the "pseudo" muscle topology can be significantly reduced to alleviate the computational burden of the machine learning engine.

Thus, a muscle model including a pseudo-muscle that is represented by muscle movements but not having a counterpart in a set of muscles, but instead representing and mapping to movements of other muscles can be used in the animation system.

In addition, the skull structure of the live actor may also provide valuable information for the machine learning system to learn the muscle movement of the live actor and the resulting skin surface. This can be an improvement over using a generic human skull topology, e.g., relying on the common anatomical bone structure of human skulls to build the skull topology, as the shape, size, curvature and/or other parameters of the human skull may vary person by person. The difference in skull structures across different live actors, though subtle, can affect the accuracy of simulated human facial expression. For example, live actor A who has prominent cheekbones might have a different range of expressions than live actor B having less prominent cheekbones.

Alternatively, some other systems obtain specific skull surface for a specific live actor based on invasive procedures, such as magnetic resonance imaging (MRI) or X-ray scans. Such invasive methods can be both expensive and inconvenient and can hardly be implemented at a massive scale when a large number of live actors are involved in film production.

In view of the need for a convenient and accurate skull surface of the live actor in computer animation, embodiments described herein might generate a skull surface that is specific to a live actor based on facial scans of the live actor and generic tissue depth data. Specifically, an animation system might process the facial scans of the live actor to obtain a skin surface topology of the live actor, based on which the skull surface underneath the skin surface can be derived by "offsetting" the skin surface with corresponding soft tissue depth at different sampled points on the skin surface.

In one implementation, the generic tissue depth data may be obtained from existing datasets, and the tissue depth data may be grouped based on a common characteristic, such as race, age, gender, body mass index, and/or the like. For example, when the live actor is a Caucasian male, generic tissue depth data may be selected from a dataset corresponding to Caucasian males.

As used herein, the term "topology" refers to properties of a geometric object that are preserved under deformations, such as stretching, twisting, crumpling and bending. For example, a facial muscle topology includes a set of data depicting the positions, shapes, and strains of facial muscles.

As used herein, the term "surface" refers to geometric properties of the outside layer of an object. For example, a skull surface includes parameters that describe the geometric properties of the outer layer of the skull, such as the curve, shape, and/or the like.

FIG. 1 illustrates an animation pipeline 100 that might be used to render animated content showing animation of a character based on a model and a rig that is generated from scans of a live actor. As illustrated there, a live actor 102 ("Actor A") might be outfitted with fiducials 104 and have their face, expressions and/or body scanned by a scanner 106. The scanner 106 would then output or store results of scanning to a scan results store 108. The fiducials 104 allow for the scan data that results from scanning to include indications of how specific points on the surface of the face of the live actor 102 move given particular expressions. If the scanner 106 captures data in three dimensions ("3D"), the scan data could also indicate the surface manifold in 3D space that corresponds to the surface of the live actor's face. While it might be expected that the skull of the live actor 102 is a constant shape and changes only by translations and rotations (and jaw movement), it is not expected that the surface manifold would be constant, jaw movements, air pressure in the mouth, muscle movements, and other movable parts move and interact. Instead, different movements and facial expressions result in different thicknesses, wrinkles, etc. of the actor's face.

The output from the scanner 106 may be stored as scan results 108, which may include a skin surface representation, muscle parameters, joint parameters, strain parameters, and/or the like.

In one implementation, the scan results 108 may also be used to generate one or more data bundles of scan results over a data bundle time period T. For example, each data bundle records a respective time-varying vector representing changes of the skin surface, muscle parameters, joint parameters, strain parameters, and/or the like over the data bundle time period T. Further details of the data bundles over a bundle time period are discussed in commonly-owned and co-pending U.S. Provisional Application Nos. 63/076,856 and 63/076,858, both filed on September 10, which are both hereby expressly incorporated by reference herein in their entirety.

In one embodiment, it might be assumed that each human actor has more or less the same facial muscles, and more or less the same bone structure in the skull. An anatomical model dataset 112 might be provided that represents muscles, where they connect, what other typical facial elements are present (eyes, eyelids, nose, lips, philtrum, etc.) and other features likely common to most human faces. The anatomical model dataset 112 may also provide a generic skull structure dataset that represents each piece of bone in the skull, the respective position parameters, the respective shape parameters, the respective connector parameter connecting to a neighboring piece, and/or the like. Of course, not all human faces and skulls are identical, and the actual positions of muscles, their thicknesses, where they connect to, how much they can relax and contract, are details that can vary from person to person, as well as the shape of their skull. In this respective embodiment, the anatomical model 112 may represent a customized muscle and/or skull dataset that is specific to Actor A, or alternatively, a generic muscle and/or skull dataset which is pre-stored in the database of anatomical database.

In one embodiment, this anatomical model 112 can be provided to a muscle simulator 110 that performs physics-based muscle simulation and provides a dynamic muscle activations dataset 113 for Actor A.

In another embodiment, the anatomical model 112 may provide a generic muscle model of muscle and skull that can be used as a reference point, together with the scan results 108 of the live actor A to provide, by the pseudo-muscle generation module 114, a specific muscle topology that is (1) customized to Actor A, and (2) has a simplified approximation structure for machine learning. Further details of the pseudo-muscle generation module 114 are further provided in relation to FIGS. 2-4.

In one embodiment, the scan results 108 can also be fed to a skull structure generation module 115, which may in turn derive the skull structure topology for Actor A from the live scan results 108 and data relating to generic facial tissue mass. Further details of the skull structure generation 115 are further provided in relation to FIGS. 2 and 5-6.

In one embodiment, the generated skull structure topology from skull structure generation 115, the pseudo-muscle topology from the pseudo-muscle generation module 114, together with the data bundles representing the time-varying vectors of muscle parameters, skin representation, joint representation, and/or the like over a bundle time period, may be input to the machine learning model 118. Based on parameters in the data bundles such as parameters of the muscles, strains, joints, and/or the like, skull parameters from the skull topology, static muscle parameters from the pseudo-muscle topology, the machine learning model 118 generates a predicted skin surface representation (e.g., the visible facial expression such as "smile," "frown," etc.). In this way, the machine learning model 118 can learn a transformation between parameters of the muscles, strains, joints, and/or the like and the skin surface representation of actor A through a training dataset in the form of data bundles representing scan results 108 from the actor A. Further details of the training process for machine learning model 118 may be found in FIG. 2.

Thus, the machine learning system 118 adopts the derived skull structure from module 115 and a pseudo-muscle topology from module 114 that are specific to Actor A, instead of generic human anatomical data. In this way, the machine learning system 118 establishes a more accurate (compared to what was traditionally done using generic anatomical data) transformative relationship that is specific to Actor A, between Actor A's skin representation and the underlying muscle/joint movement parameters of Actor A. For instance, the underlying muscle/joint movement parameters may include the positions of the muscles that are moved, strain values, direction of movements, attachment points to the joint, and/or the like, all of which are specific to Actor A.

In addition, as the pseudo-muscle topology generated from module 114 has a reduced degree of freedom compared with a traditional facial muscle polygon topology, the computational efficiency of machine learning model 118 may be improved.

In one implementation, the machine learning model 118 may be trained to infer the shape of the live actor's skull, volume of muscles, range of motion, etc., to build a manifold of possible movements for the actor. The machine learning model 118 might output a manifold to be stored in manifold storage 116. The manifold might represent the range of plausible expressions. Logically, the manifold might represent a set of solutions or constraints in a high-dimension space corresponding to a strain vector.

For example, the machine learning model 118 may be trained to determine an action locus for the movement or expression adjustment (e.g., from "smile" to "grin") and a range of action (e.g., widened month, showing of teeth, changed upward angle of the mouth, etc.) made by the actor A, based on the data bundles from the data bundle generation 114. The machine learning model 118 may then determine a subset of the muscle strain vector applicable to the range of action, e.g., which muscles are used, and what are the corresponding strains. The machine learning model 118 may determine the manifold that limits changes to the data bundle to changes in the subset of the muscle strain vector. For example, for the movement or expression adjustment (e.g., from "smile" to "grin"), the manifold model 116 may limit the changes to the strain vectors in the data bundle to a subset of muscle strain vectors relating to muscles that widen the month and show teeth, and the corresponding strains that change the upward angle of the mouth.

Correspondingly, the manifold model 116 also limits the search of updated vector values for muscle vectors or strain vectors to a manifold of allowed values for an updated cache of data vectors when the movement or expression adjustment (e.g., from "smile" to "grin") takes place. The manifold model 116 of allowed values correspond to known feasible expressions of the live actor.

Using an animation creation system 120, an animator 112 could generate meshes that correspond to facial expressions of the live actor for whom the muscle model was derived. A mesh might be stored in a mesh deformation store 124. If mesh corresponded to the facial surface of Actor A, the animation creation system 120 could be used by the animator 122 to generate a facial surface of an expression that was not specifically made by Actor A, but would be near what it would be if Actor A had tried that expression. The animation creation system 120 might constrain an animator's inputs by projecting them onto the manifold, which would have an effect of transforming animator inputs that are not corresponding to a plausible expression into a strain vector that does correspond to a plausible expression. The animator's inputs might be represented in memory as a strain vector, having components corresponding to some facial muscles, as well as other animation variables that might not be related to muscles or that are more easily represented directly, such as jaw movement, eye movement, and the like. A strain vector might be represented by an array of values, wherein a value in the array corresponds to a vector component that is a value of strain in a particular dimension, representing strain on one muscle perhaps.

As for inputs and outputs of an animation creation system 120, inputs might include an input strain vector, indicative a strain values for some or all of the muscles in the muscle model, and values for the other animation variables, such as a scalar value for a jaw angle, two 2D vectors corresponding to rotations of the eyes, etc. Along with the muscle model, which describes where the muscles are attached and their volume, and a skull model representing an actor's skull shape and contour, and a control vector for other non-muscle animation variables, the animation creation system 120 can determine the volumes occupied by the muscles, and thus the surface of the character's skin, and output a mesh manifold of the character's skin, possibly depicting an expression corresponding to the input strain vector.

Using the above methods and apparatus, an animator can specify a facial expression in the domain of muscle semantics, which can simplify an animation process compared to limiting the animator to making combinations of recorded expressions as blends of the scanned facial shapes. In the general case, a length of a muscle is determined from its strain value and its rest length. Allowed strain values might be constrained by the manifold so that strain values remain within plausible boundaries. For a given scan of an expression on an actor's face, a muscle model for that live actor, and a skull model for that live actor, an AI process can determine a likely strain vector that, when input to an animation generation system, would result in an expression largely matching the scanned expression. Knowing the strain values, the animation generation system can provide those as the domain in which the animator would modify expressions. After training an AI system using dynamic scans of an actor's face as the ground truth for training, the muscle model can be derived that would allow for the simulation of other expressions that were not captured.

In some instances, there might be more than one hundred muscles represented in the muscle model and the AI system that extracts a strain vector and a control vector from dynamic scans of the actor might be able to provide approximate solutions to match expressions. The control vector might include other values besides jaw and eye positions.

As explained herein, an animation process might simulate facial expressions through the use of a unique combination of hi-resolution scans of a human face, simulated muscles, facial control vectors, and constraints to generate unlimited facial expressions. In one embodiment, an AI system is employed to receive facial control vectors generated from a series of muscle strain inputs and process those vectors relative to a facial expression manifold configured to constrain facial expressions of the simulation to plausible expressions. Simulation need not be limited to simulating facial expressions that correspond to a real-world physical action, but more generally might be the generation of facial expressions informed by expressions made and recorded.

Separate AI systems might be used to train and derive the muscle model and to train and derive the manifold. In some embodiments, in order to hit a target expression (and corresponding skin shape), the muscle model might be differentiable. An AI system might include a variational auto-encoder (VAE).

The AI uses muscle control vectors, instead of blend shape weights or other approaches, and can then specify strains on those muscle control vectors, which would in turn specify lengths of contractions of the muscles in a simulator. Each muscle scan be represented by a curve, which might have a length that is a function of the strain. A muscle vector might comprise strains that affect a mesh representing the skin of a character. The muscles might include a rest length and attachment point, and together represent a muscle geometry. Using the combination of the input scans, the strains, the muscle control vectors, and manifold constraints, an animation system can output plausible facial expressions.

A renderer 126 can process the facial surface, perhaps mapping it to a character model from a character model store 128, such as a non-human character played by Actor A, to form animated output that might be stored in animated output store 130.

Figure 2:
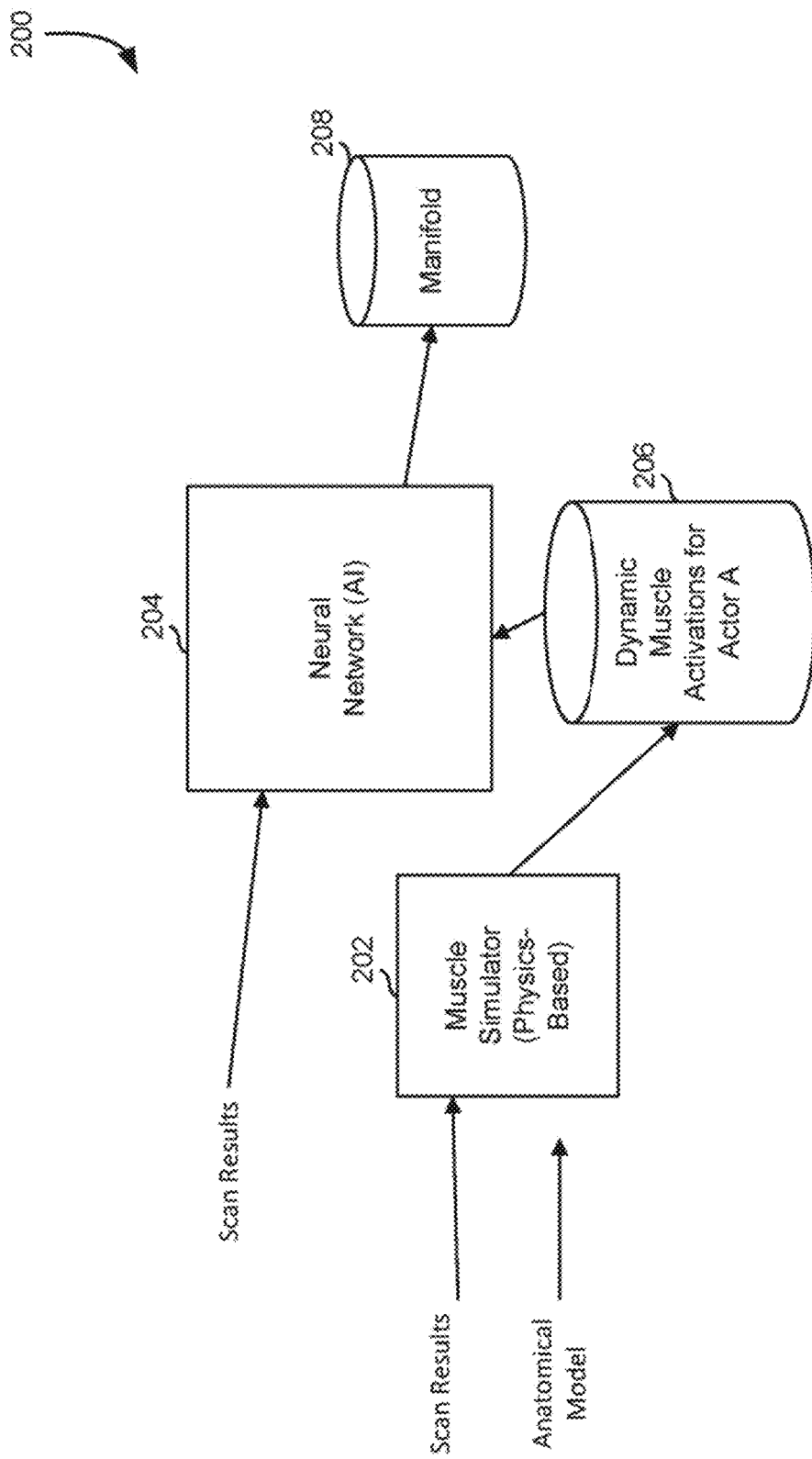
FIG. 2 illustrates an example neural network, in an embodiment.

FIG. 2 illustrates an example neural network system 200 in which scan results are provided to a muscle simulator 202 and a neural network 204 and an anatomical model to the muscle simulator 202. An output of the muscle simulator 202 is dynamic muscle activations for Actor A, which in turn are provided to neural network 204. Neural network 204 then outputs a manifold to manifold storage 208.

FIG. 3 illustrates an example of a data structure that might represent a muscle model. In that model, each muscle might be defined by a bone attachment point, a skin attachment point, and a muscle volume. In animation, as the strain on a muscle changes, the volume of the muscle might change shape, and the distance between the bone attachment point and the skin attachment point might change, thus creating expressions. Additional elements might be included in a control vector that are for other animation variables.

Figure 4:
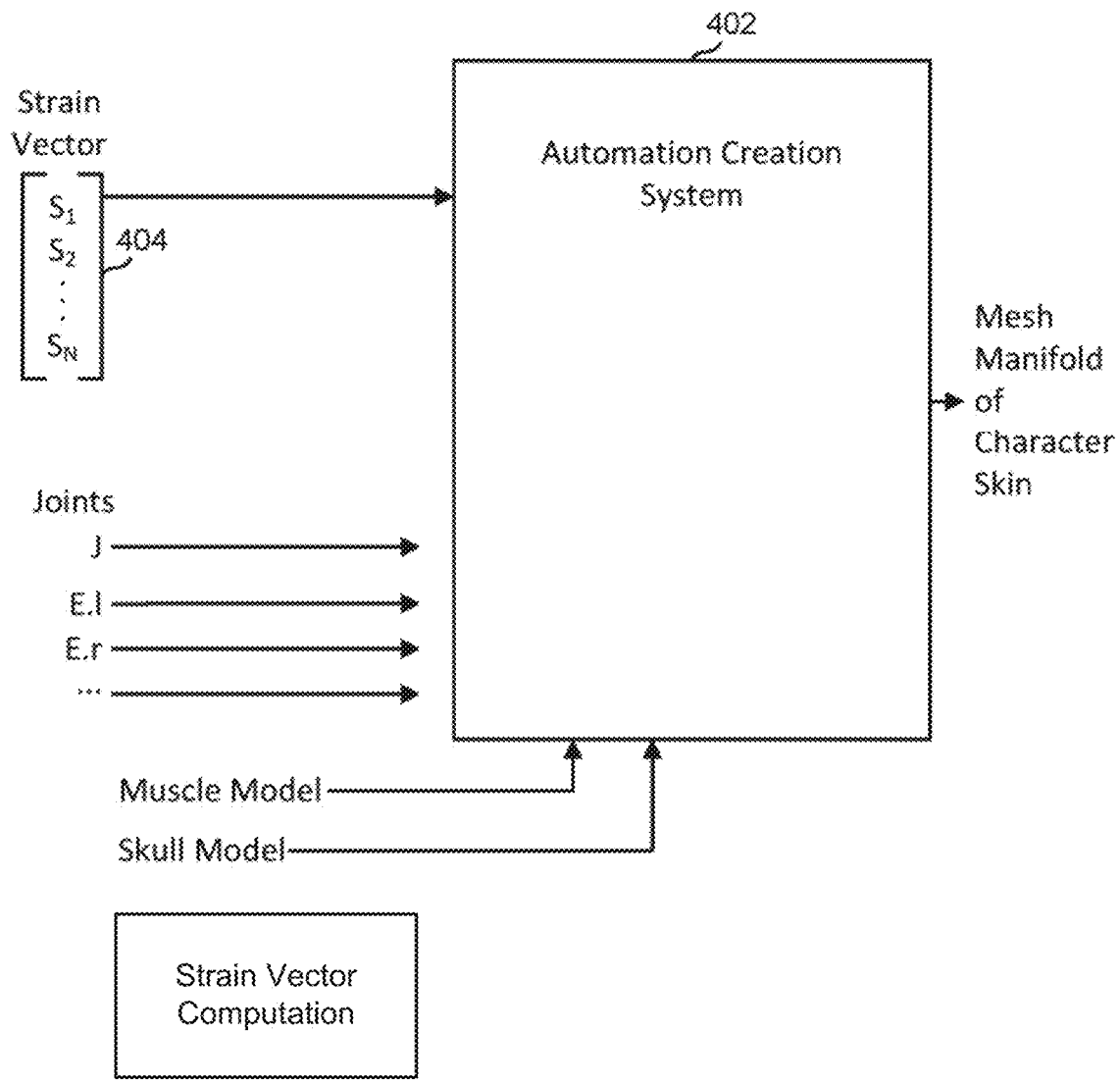
FIG. 4 illustrates inputs and outputs of an animation creation system, in an embodiment.

FIG. 4 illustrates inputs and outputs of an animation creation system 402. Inputs might include an input strain vector 404, indicative a strain values for some or all of the muscles in the muscle model, and values for the other animation variables, such as a scalar value for a jaw angle, two 2D vectors corresponding to rotations of the eyes, etc. Along with the muscle model, which describes where the muscles are attached and their volume, and a skull model representing an actor's skull shape and contour, and a control vector for other non-muscle animation variables, the animation creation system 402 can determine the volumes occupied by the muscles, and thus the surface of the character's skin, and output a mesh manifold of the character's skin, possibly depicting an expression corresponding to the input strain vector 404.

Figure 5:
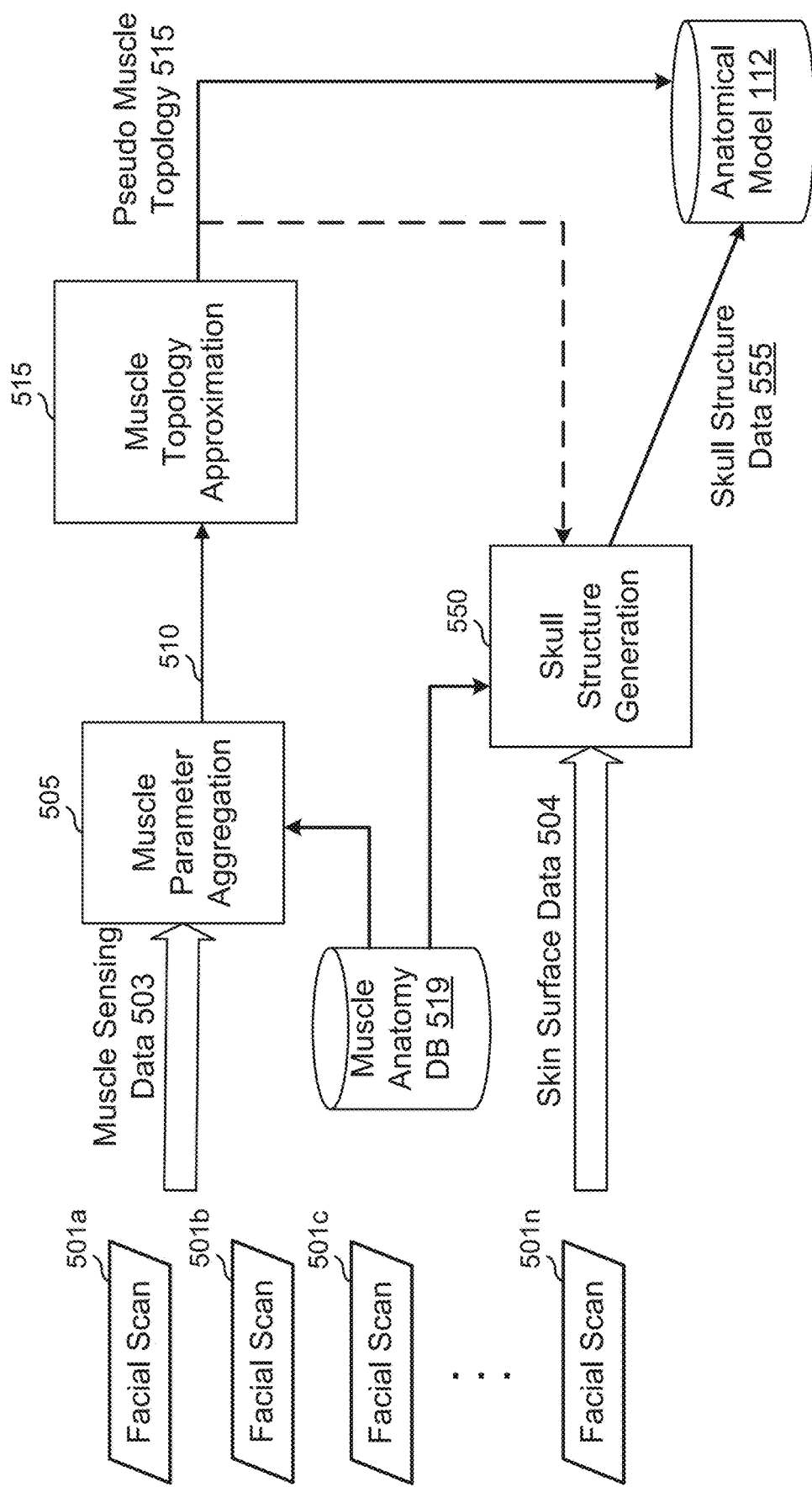
FIG. 5 provides an example diagram illustrating building the anatomical model of the specific live actor for the animation pipeline shown in FIG. 1, according to one embodiment described herein.

FIG. 5 provides an example diagram illustrating building the anatomical model of the specific live actor for the animation pipeline shown in FIG. 1, according to one embodiment described herein. The muscle parameter aggregation 505 and the muscle topology approximation 515 may be a combined module, or separate modules, which may serve similar functions as the pseudo-muscle generation 114 in FIG. 1. The skull structure generation module 550 may be similar to module 115 in FIG. 1.

A number of facial scans 501a-n may be obtained, e.g., see 108 in FIG. 1, and used for anatomical data building. Each facial scan may include an image of the skin surface of the live actor, e.g., skin surface data 504, and a set of facial muscle sensing data 503 accompanying the skin surface data 504.

In one embodiment, the muscle sensing data 503 from the facial scans 501a-n and reference data from a muscle anatomy database 519 may be sent to the muscle parameter aggregation 505. For example, the reference data may include information of a generic muscle topology of a human being, such as a start connection point of the muscle, an end connection point of the muscle, additional attachment point (to the skull) of the muscle, the shape of the muscle, the curvature of the muscle, and/or the like. The muscle sensing data 503 collected by the fiducial markers 104 may take a form, in one example, as (marker index, muscle name, muscle start, muscle end, marker position, strain value, . . . ). In this way, the muscle sensing data 503, together with the reference data, may be used to construct a muscle topology customized to the live actor.

The muscle topology generated by the muscle parameter aggregation 505 might be represented as a geometric data structure, such as a shape of a polygon positioned in a three-dimensional ("3D") space. Each surface or edge of the polygon can then represent a muscle tissue, and each node of the polygon can then represent a connector point of the muscle that is attached to the skull. For example, one surface of the polygon structure may represent the muscle "frontal eminence," with one edge of the respective edge representing the start of the muscle "eye pupil center," and another edge of the respective edge representing the end of the muscle "anterior point of the forehead." Other edges of the surface for the muscle "frontal eminence" may be used to define the connectors that connect "frontal eminence" to another piece of muscle.

As previously described, the generated muscle polygon topology 510 may be directly fed to the ML system 118 for predicting a skin surface given a set of muscle strain values and/or joint parameters. However, the polygon topology 510 has a high degree of freedom, and may introduce heightened complexity to the ML system 118. The muscle topology approximation module 515 may build a pseudo-muscle topology based on the polygon topology 510 by extracting a number of pseudo-muscles from the geometry of the polygon 510.

Specifically, a subset of facial muscles from the muscle polygon topology 510 may be selected and pseudo-muscles are generated to approximate the subset of facial muscles in positions such that each pseudo-muscle may represent or substitute a facial muscle the topology 510. For example, based on generic human anatomical knowledge, some facial muscles may have "subunits," e.g., a portion of a muscle may act independently from another portion of the muscle depending on how it is innervated by the nervous system. In this case, the "subunit" of the muscle can be selected. For another example, the directions of skin movements of the live actor may be observed, and a pseudo-muscle may be selected or placed at an area where the skin at the same area may not be well captured by an anatomical muscle.

In one implementation, each pseudo-muscle takes a form as a muscle curve described by the start of the muscle curve, the end of the muscle curve, and the line or curve connecting the start and the end. The muscle curve may be a line segment connecting the start and the end of the curve, or may follow the curvature of the underneath skull surface. The length of the muscle curve can be computed based on the start position and the send position of the muscle curve. Thus, the set of muscle curves may form a graph structure, with each edge of the graph structure representing a "simplified" pseudo-muscle model, and each node of the graph structure representing the connector that one muscle connects to another muscle, e.g., the connectivity information between pseudo-muscles.

The muscle topology approximation 515 may further extract strains from the pseudo-muscle topology. For example, the muscle topology approximation 515 may map the muscle curves in the pseudo-muscle topology to the fiducial markers 104, which may in turn obtain measurements of the curve start and the curve end positions, and the curve lengths at different times. For example, a mapping between the subset of facial muscles and the generated pseudo-muscles can be determined such that the start position and the end position of each pseudo-muscle can be mapped to and from the 3D position of a corresponding facial muscle in the polygon topology 510. In this way, "pseudo-strains" corresponding to the pseudo-muscles can be computed based on the position changes of muscle curves.

For instance, a facial scan of the live actor in a neutral facial action, and a facial scan of the live actor in a non-neutral facial action (e.g., "angry," "laugh," "grin," etc.) may be used to derive the positions of facial muscles, which can in turn be mapped to respective start and end positions of pseudo-muscles (muscle curves). In this way, the muscle curve length (associated with the specific non-neutral facial action) and the muscle curve rest length (associated with the neutral facial action) may be determined, e.g., based on the respective start positions and end positions of the muscle curves.

For example, the respective pseudo-muscle strain can then be computed as illustrated by Equation 2.

$$\text{Strain(curve\_index)}=(\text{curve\_length\_rest(curve\_index)}-\text{curve\_length\_motion (curve\_index)})/\text{curve\_length\_rest(curve\_index)} \quad (\text{Eqn. 2})$$

The computed pseudo-strain values may then be used for the ML system 118 to learn the pseudo-strains for a certain facial expression.

In some implementations, in order to reduce the dimension and degree of freedom of the pseudo-muscle model from the generated polygon topology 510, a subset of facial muscles that largely represent the movements of facial muscles in the polygon topology 510 may be selected. For example, in one implementation, a representative muscle tissue may be selected from a small cluster of adjacent muscle tissues for generating a pseudo-muscle representing the small cluster. For another example, each pseudo-muscle may be an "average" (in terms of the coordinates of the start position and the end position) of a small cluster of adjacent muscle tissues.

The selection of the subset of facial muscles for generating the pseudo-muscle may be constantly revised, e.g., based on the performance feedback from a machine learning system 118. For example, different selections of subsets of facial muscles may generate different sets of pseudo-muscles, and these different sets of pseudo-muscles may be input to the machine learning system 118 to generate facial manifolds. The machine learning system 118 may learn from a loss between the generated facial manifolds and ground truth labels, while the selection of the subset of facial muscles for generating pseudo-muscle model may change. For example, the final loss from the designed system, that is, a mean squared distance between the predicted and the ground-truth mesh should decrease when more muscles are selected to form the pseudo-muscles.

In another implementation, the performance feedback may include animator feedback regarding usability of the generated mesh based on the pseudo-muscles. The animator feedback may be combined with the final loss to fine tune the selection of the subset of muscles.

Alternatively, instead of directly using the computed strain values for the pseudo-muscle topology in computer animation, a mapping between the selected subset of muscles from the polygon topology and pseudo-muscles may be established. The mapping represents effects on the pseudo-muscle strain value that substitutes for effects on muscle strain values of muscles of the subset of "actual" muscles. Thus, the computed strain values over a time period may be converted to muscle strain values corresponding to the "actual" muscles, using the mapping. The converted "actual" muscle strain values corresponding to the "actual" muscles in the polygon topology are sent to the animation system for computer animation of a computer-generated character.

In one embodiment, the skin surface data 504 together with the reference data indicating facial tissue depth from the muscle anatomy database 519 may be fed to the skull structure generation 550 to construct a skull structure 555 specific to the live actor. For example, the muscle anatomy database 519 may provide generic facial tissue depth data including an average tissue thickness of each facial muscle, e.g., supraglabella=3.9 mm, glabella=4.9 mm, etc.

In one implementation, the skull structure generation 550 may choose a specific tissue depth dataset from available datasets, based on a variety of factors, such as the race, ethnicity, age, body weight, gender, body mass indicator, and/or the like. For example, generic facial soft tissue thickness data for Caucasians may be provided in Greef et al., Large-scale in-vivo Caucasian facial soft tissue thickness database for craniofacial reconstruction, Forensic Science International 159S, S126-S146, 5006, which is hereby expressly incorporated by reference herein in its entirety.

In one implementation, the skull structure generation 550 may then use the reference facial soft tissue thickness data and the skin surface data 504 to derive a skull structure. For example, for each fiducial marker position 504 from the facial scans 510a-n, the skull structure generation 550 may map the respective fiducial marker to a soft tissue from a tissue array in the soft tissue thickness dataset, and may then compute the position of a corresponding spot on the skull where the soft tissue is attached to by offsetting the position of the fiducial marker by the respective thickness of the soft tissue. In this way, the skull structure may be reconstructed by interpolating all the computed positions of spots on the skull.

In one implementation, the skull structure generation 550 may further assess the pseudo-muscle topology 515 from the topology approximation 515 to further incorporate personalized anatomical data into skull structure generation. For example, when mapping a respective fiducial marker in the skin surface data 504 to a soft tissue from a tissue array in the soft tissue thickness dataset, the pseudo-muscle topology 515 may be used to provide an estimate of the shape and position of the muscle underneath the position of the respective fiducial marker on the skin surface.

The generated pseudo-muscle topology 515 and the skull structure data 555 may then be provided and stored as part of the anatomical model 112, which can then be fed to the ML system 118 as described in relation to FIG. 1

Figure 6:
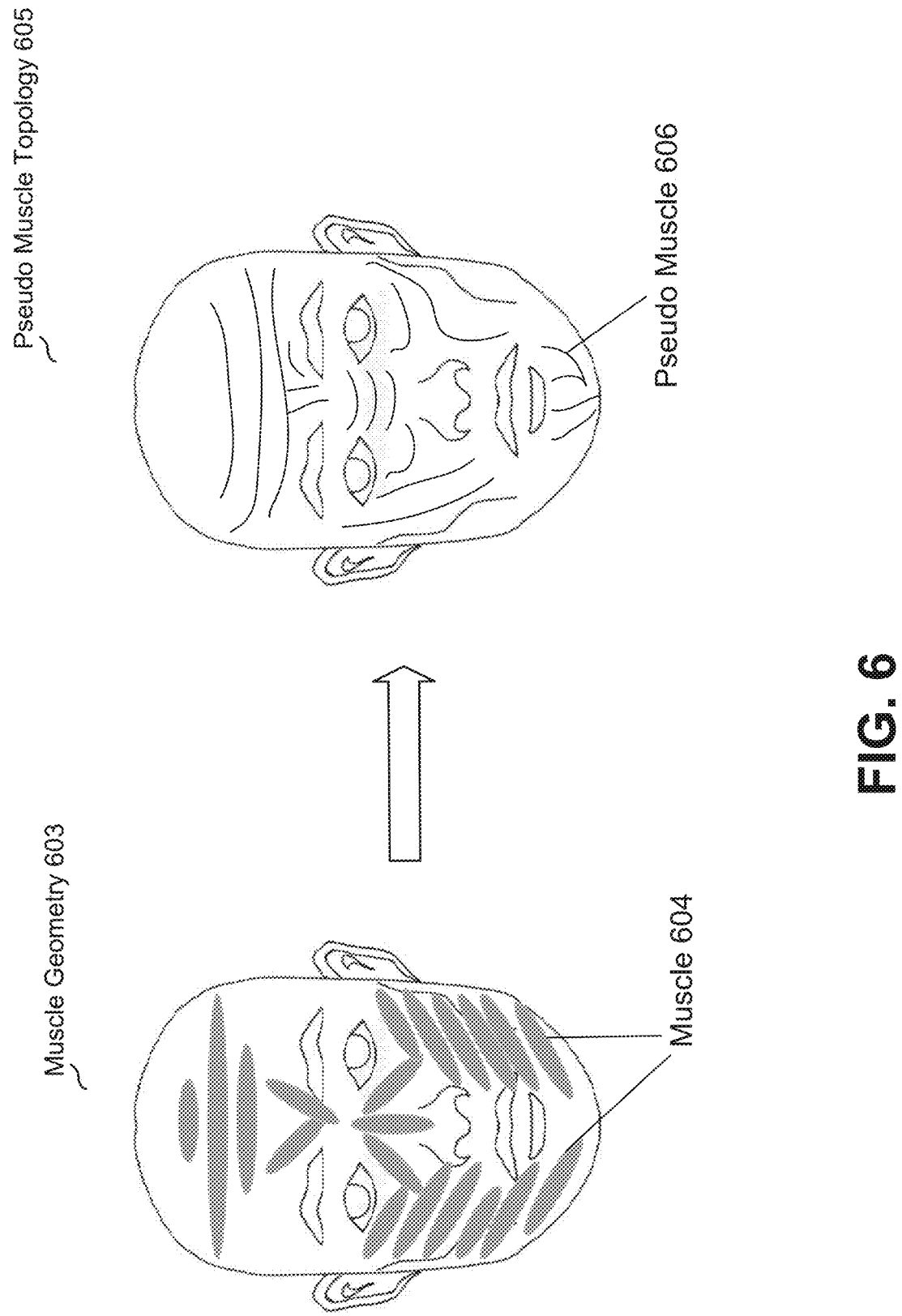
FIG. 6 provides an illustrative diagram showing a pseudo muscle topology that approximates the muscle geometry model of the live actor, according to one embodiment described herein.

FIG. 6 provides an illustrative diagram showing a pseudo-muscle topology that approximates the muscle geometry model of the live actor, according to one embodiment described herein. The muscle geometry 603 illustrates an example polygon topology 210 generated by the muscle parameter aggregation 205. For example, each facial muscle 604, may be represented by a surface of the polygon geometry. The complexity of the mathematical description of a polygon having a large number of surfaces may significantly increase the computational burden to the system.

The pseudo-muscle topology 605 (similar to 515 in FIG. 5) illustrates a "simplified" graph structure where each pseudo-muscle 606 takes a form of a curve in the 3D space. Thus, the pseudo-muscle topology 605 can be mathematically represented by a set of curves, each having a start and an end. The reduction in computational complexity can be further illustrated in FIG. 7.

FIG. 7 provides an illustrative diagram showing reduction in the degree of freedom of the muscle topology data structure, according to one embodiment described herein. The original polygon muscle topology 303 may be described by a number of variables with a large degree of freedom, e.g., each muscle is described by the 3D coordinates of the set of bone attachment points, the set of skin attachment points, and the muscle volume, as shown in FIG. 3. The total number N of muscle points may be a large number as the muscle points are sampled from a polygon structure.

The reduced pseudo-muscle topology 305, instead, may be described by a set of muscle curves represented by (curve_start, curve_end, curve_length). For example, the curve_start and curve_end may be described by a set of 3D coordinates, and the curve length may be derived from curve_start and curve_end. The total number n of curves can be much smaller than the total number N of muscle points in the polygon topology.

For example, the dimension of each muscle geometry may be the number of vertices of a muscle chunk times 3. If the muscle geometry (e.g., a polygon) has 200 vertices, the dimension will become 200×3=600. Reduced dimensions by using pseudo-muscle strains may have the dimension defined by the number of muscle curves derived from a muscle chunk. If a muscle geometry has 3 curves (including pseudo-muscle curves), then the dimension will become 3.

Figure 8:
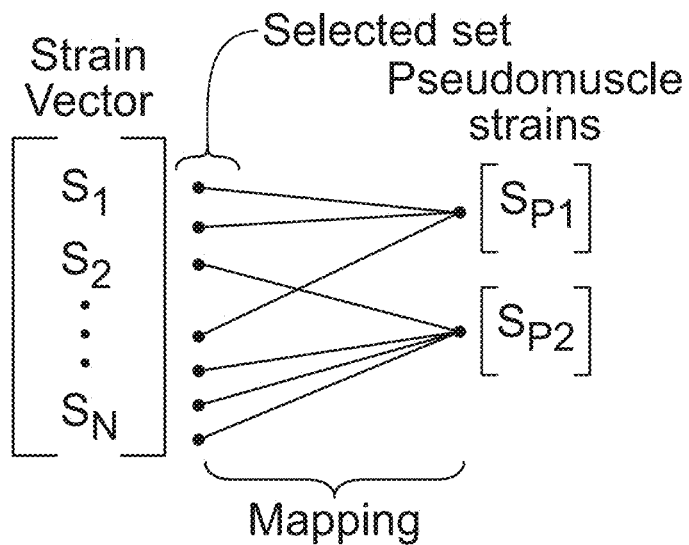
FIG. 8 illustrates a mapping between muscles and pseudo-muscles.
Figure 9:
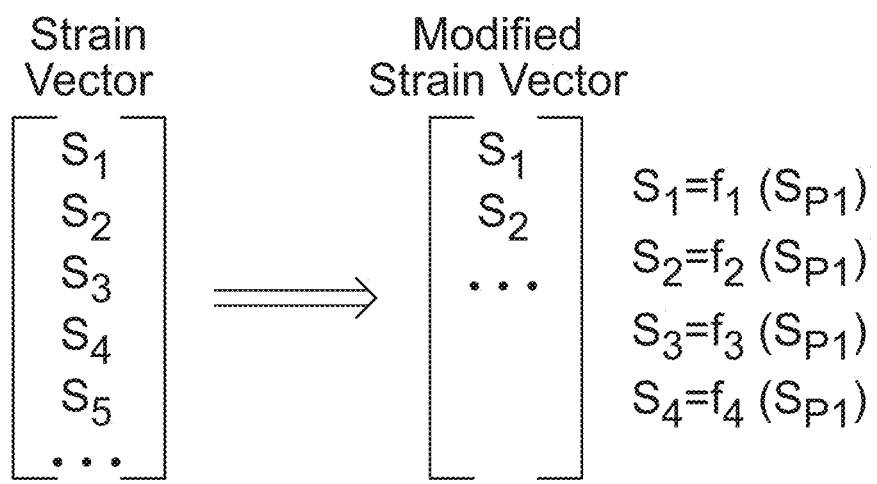
FIG. 9 illustrates a mapping between muscles and pseudo-muscles where muscle strains are predetermined functions of a pseudo-muscle strain.

FIG. 8 illustrates a mapping of strains of muscles in a muscle model to pseudo-muscles in a modified muscle model. As illustrated there, there is a selected set of muscles to be replaced or partially affected by pseudo-muscles. While it is possible to have the selected set by all of the muscles, often a suitable modified model need only affect some smaller subset. In the example shown, a first pseudo-muscle, $S_{P1}$, maps to three muscles from a muscle model so that an animator's manipulation of a strain of $S_{P1}$, can result in changes to three strains in the strain vector. For a second pseudo-muscle, $S_{P2}$, four muscles from the muscle model are mapped to it so that an animator's manipulation of a strain of $S_{P2}$ can result in changes to four strains in the strain vector. The mapping between pseudo-muscles and muscles can be linear or otherwise. In some instances, an animator can choose to modify a muscle as well as a pseudo-muscle that affects that muscle. As the strain value of the pseudo-muscle is adjusted, the strains of the corresponding muscles are adjusted correspondingly.

FIG. 6 illustrates the case where the strains of the original muscles are not independently controlled, but are functions of the strain of a pseudo-muscle. An animation process, such as a simulator or a rig manipulator, might process a strain vector to determine a shape or expression for a facial rig according to a provided strain vector, but in this case, the animator does not independently specify strains for muscles $M_1$, $M_2$, $M_3$, and $M_4$. Instead, their strains are computed by the animation process as functions of the strain of a pseudo-muscle $SP_1$, and other strains might be independently specified.

A very specific example of the use of pseudo-muscles might occur where an animator's user interface provides a display of a facial rig and allows for an animator to input strain values for the many radial muscles attached to the lips of the facial rig. Rather than require that the animator specify each muscle's strain separately, the animator can specify the strain on a pseudo-muscle that runs tangentially to the mouth of the facial rig.

In some implementations the mapping to muscles need not be unique, in that more than one pseduomuscle might map to a given muscle.

An AI system might determine the attachment points, volume, range of strain, etc. for the pseudo-muscle, based on training on models and/or training on prior animator inputs. An AI system might start with an anatomical default model and model facial muscles as geometry, such as polygonal structures, as well as extracting muscle curves for lines of action and endpoints for the muscles. The AI system can then use machine learning to (1) determine what selected set of muscles might be grouped together and replaced in whole or part by a pseudo-muscle, and (2) determine the lines of action and endpoints for the pseudo-muscle, as well as determining what a suitable mapping might be between the strains of the selected set and the pseudo-muscle.

Using the above methods and apparatus, an animator can specify a facial expression in the domain of muscle semantics, which can simplify an animation process compared to limiting the animator to making combinations of recorded expressions as blends of the scanned facial shapes. In the general case, a length of a muscle is determined from its strain value and its rest length. Allowed strain values might be constrained by the manifold so that strain values remain within plausible boundaries. For a given scan of an expression on an actor's face, a muscle model for that live actor, and a skull model for that live actor, an AI process can determine a likely strain vector that, when input to an animation generation system, would result in an expression largely matching the scanned expression. Knowing the strain values, the animation generation system can provide those as the domain in which the animator would modify expressions. After training an AI system using dynamic scans of an actor's face as the ground truth for training, the muscle model can be derived that would allow for the simulation of other expressions that were not captured.

In some instances, there might be more than one hundred muscles represented in the muscle model and the AI system that extracts a strain vector and a control vector from dynamic scans of the actor might be able to provide approximate solutions to match expressions. The control vector might include other values besides jaw and eye positions.

As explained herein, an animation process might simulate facial expressions through the use of a unique combination of hi-resolution scans of a human face, simulated muscles, facial control vectors, and constraints to generate unlimited facial expressions. In one embodiment, an AI system is employed to receive facial control vectors generated from a series of muscle strain inputs and process those vectors relative to a facial expression manifold configured to constrain facial expressions of the simulation to plausible expressions. Simulation need not be limited to simulating facial expressions that correspond to a real-world physical action, but more generally might be the generation of facial expressions informed by expressions made and recorded.

Separate AI systems might be used to train and derive the muscle model and to train and derive the manifold. In some embodiments, in order to hit a target expression (and corresponding skin shape), the muscle model might be differentiable. An AI system might include a variational auto-encoder (VAE).

The AI uses muscle control vectors, instead of blend shape weights or other approaches, and can then specify strains on those muscle control vectors, which would in turn specify lengths of contractions of the muscles in a simulator. Each muscle scan be represented by a curve, which might have a length that is a function of the strain. A muscle vector might comprise strains that affect a mesh representing the skin of a character. The muscles might include a rest length and attachment point, and together represent a muscle geometry. Using the combination of the input scans, the strains, the muscle control vectors, and manifold constraints, an animation system can output plausible facial expressions. According to one embodiment, the techniques described herein are implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

An AI system can be used to determine suitable pseudo-muscles and their mapping to other muscles.

Figure 10:
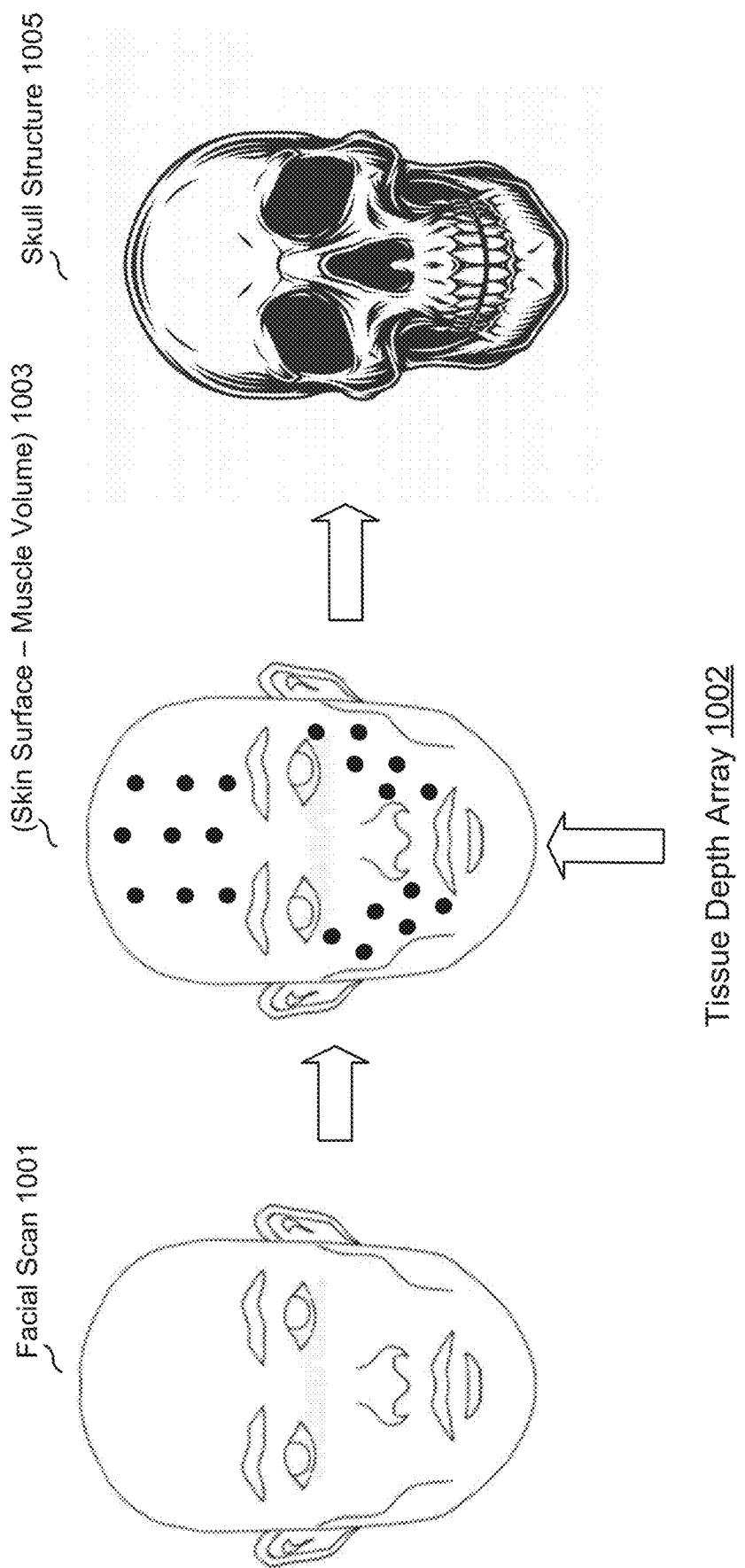
FIG. 10 provides an illustrative diagram showing the derivation of a skull structure of the live actor based on facial scans and generic tissue depth data, according to one embodiment described herein.

FIG. 10 provides an illustrative diagram showing the derivation of a skull structure of the live actor based on facial scans and generic tissue depth data, according to one embodiment described herein. A facial scan 1001 (e.g., similar to facial scans 501a-n in FIG. 5) may provide the physical appearance of the skin surface of a live actor. A tissue depth array 502, e.g., obtained from the muscle anatomy database 519, may be applied to the facial scan 1001.

For example, the tissue depth array 1002 may include a plurality of muscle points (fiducial markers) and the corresponding average tissue thickness underneath the fiducial markers. A plurality of bone attachment points on the skull may then be derived based on the fiducial markers on skin surface and the average tissue thickness at 1003. The plurality of bone attachment points may be used to construct, e.g., via interpolation, a 3D skull surface 1005.

Figure 11A:
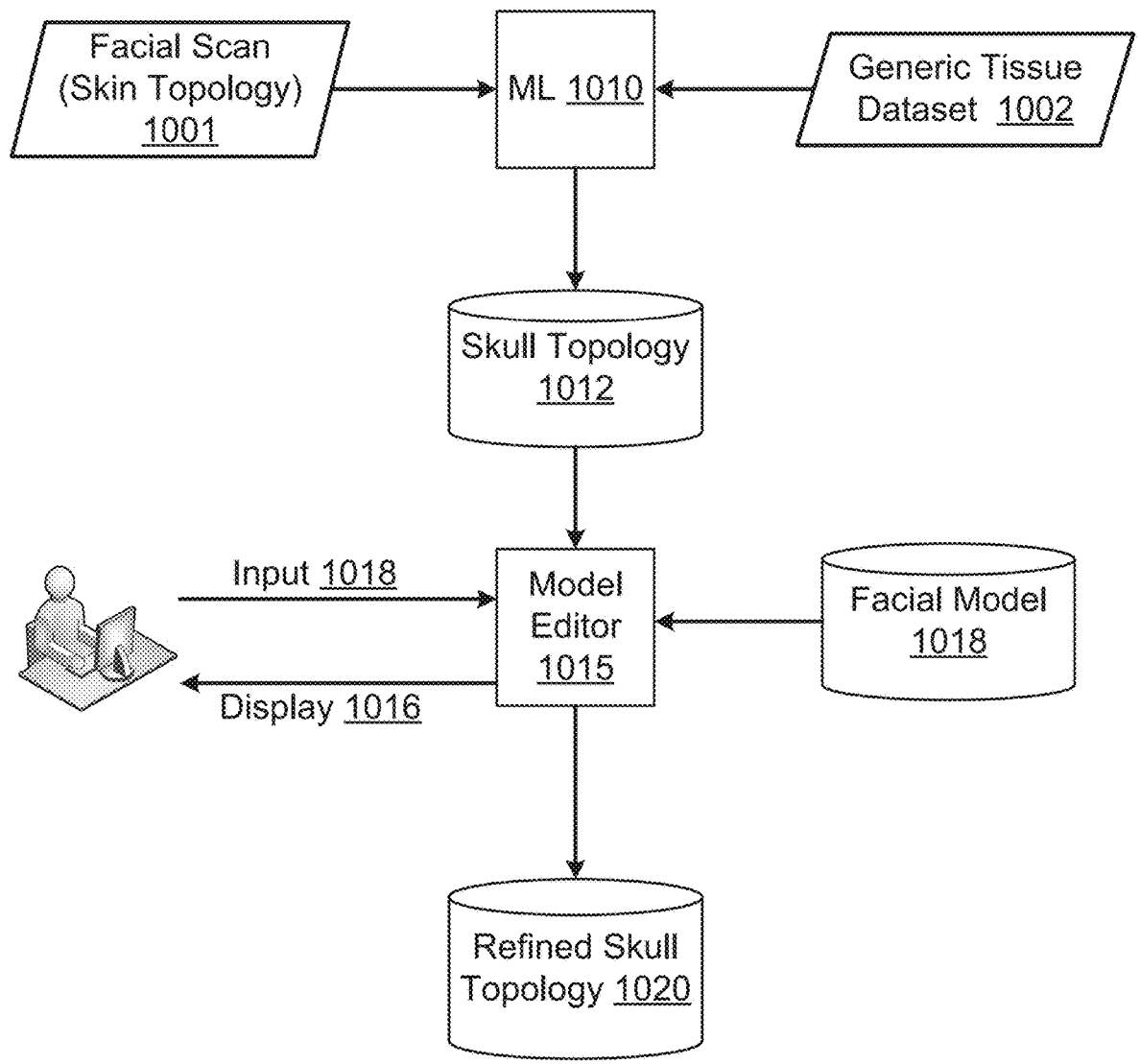
FIG. 11A provides a block diagram illustrating a process of generating and refining the skull surface of the live actor, according to one embodiment described herein.

FIG. 11A provides a block diagram illustrating a process of generating and refining the skull surface of the live actor, according to one embodiment described herein. Facial scan 1001 that includes the skin topology and generic tissue dataset 1002 including a tissue depth array may be input to a machine learning engine 1010, which learns the underneath skull structure corresponding to the facial scan 1001. In one implementation, the generic tissue dataset 1002 may be selected based on specific race, ethnicity, age, or the body mass index of the live actor.

The machine learning engine 1010 may generate a skull surface 1012, which is further output to a model editor 1015. For example, the model editor 1015 may display the constructed 3D skull surface on a user interface 1016, e.g., similar to 1005 in FIG. 5. A user, such as an animator, etc., may edit the generated skull surface by submitting an input 1018 via the user interface, e.g., by shifting, modifying, smoothing, adjusting, and/or the like certain parts of the generated skull surface 1012. For example, the user may directly interact with a graphic user interface (GUI) to modify the skull topology, such as enlarging an eye socket, lowering the curve of cheekbone, and/or the like. For another example, the user may enter specific parameters to change the size, shape, and/or position coordinates of a specific bone in the skull.

In another implementation, the model editor 1015 may receive personalized facial parameters such as muscle position, muscle depth, joint parameter, and/or the like from a facial model dataset 1018. The facial model dataset 1018 may be a generic anatomical facial muscle dataset, or a personalized facial muscle topology such as the muscle geometry 303 or the simplified pseudo muscle topology 305, both specific to the live actor. The model editor 1015 may further adjust the skull surface 1012 based on the personalized facial muscle parameters. For example, the model editor 1015 may adjust the position of corresponding bone attachment points in the skull surface based on the position of a corresponding muscle (e.g., supraglabella, etc.) that is attached to the respective bone.

Figure 11B:
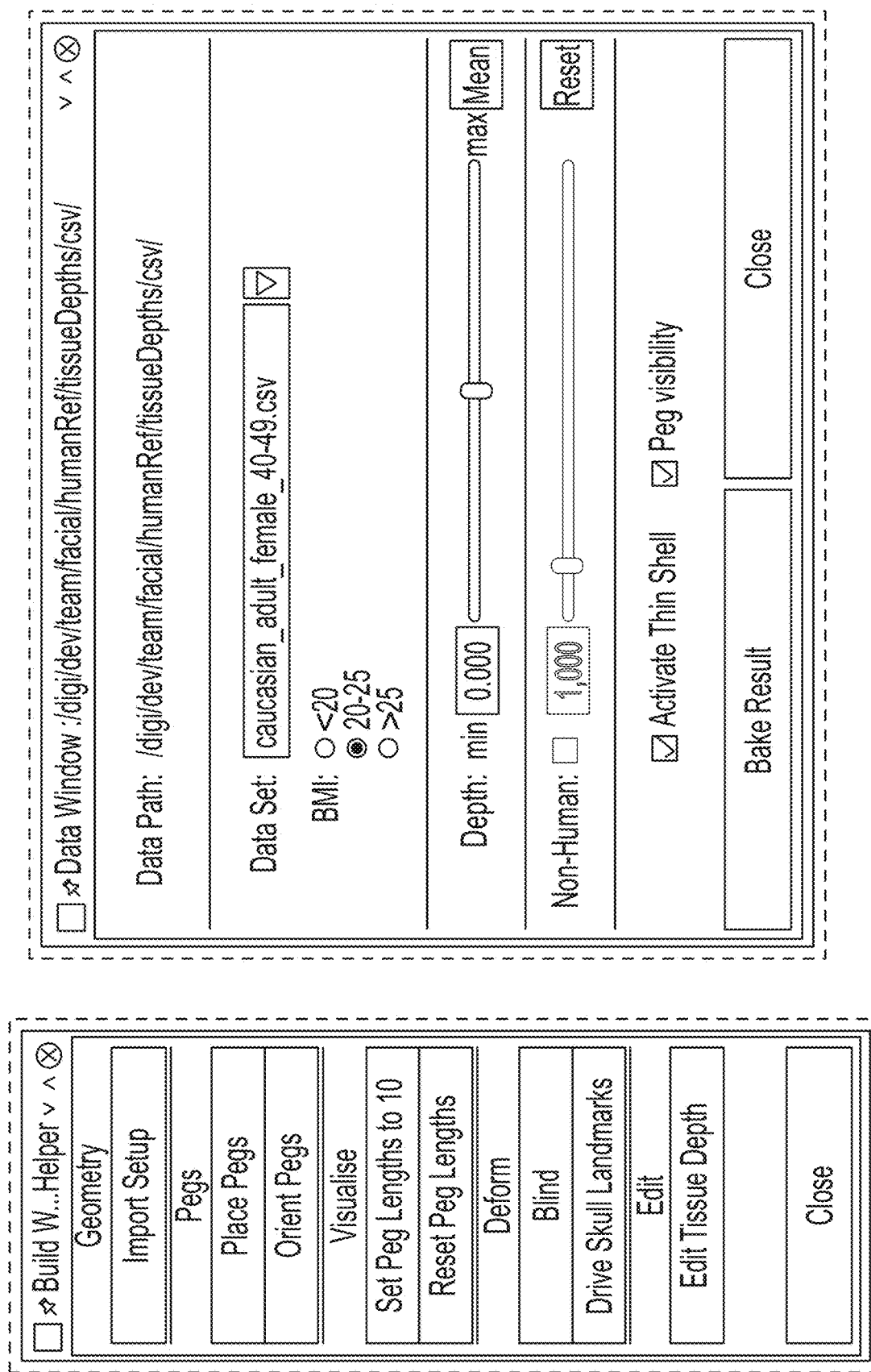
FIG. 11B provides an example user interface diagram illustrating an editor tool for editing the skull surface, according to one embodiment described herein.

For example, FIG. 11B provides an example UI interface of the model editor 1015. The user may modify the skull that has been deformed according to the tissue depths by editing various parameters through the model editor 1015. For instance, the user may manually move a 'live' cage (not shown in FIG. 11B) around the generated skull surface that allows some coarse deformation by moving vertices and affecting the higher resolution skull contained within it. The modified deformation may result in changed skull surface geometry. The user may further modify the skull surface geometry by changing the initial rigid alignment of the template skull inside of the actor skin, executing the deformation, editing of tissue depth, modifying parameters such as ethnicity, age, gender, bmi, tissue depth variation (min/max/mean), non-human scale (if required), toggling of visualisation aids, and/or the like. The user may further apply coarse deformation by moving vertices on a 'live' cage around the skull as described above, and result in final model refinement using any modelling tools available, resulting in moved vertices on the final skull mesh.

The model editor 1015 may thus generate a refined skull surface 1020, which may be used by the machine learning system 118 to learn the relationship between muscle parameters and skin surface representation.

Figure 12:
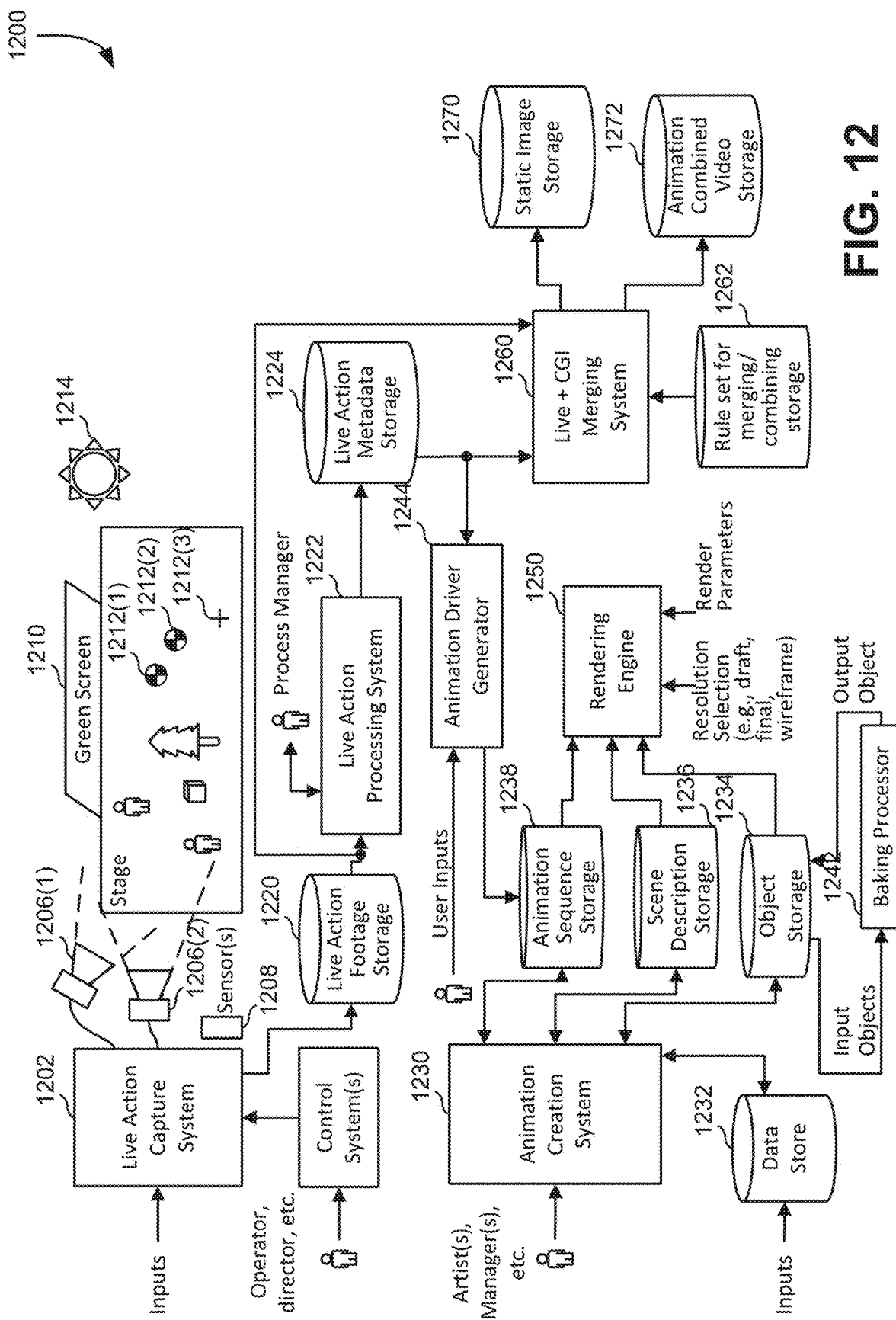
FIG. 12 illustrates an example visual content generation system as might be used to generate imagery in the form of still images and/or video sequences of images, according to various embodiments.
Figure 13:
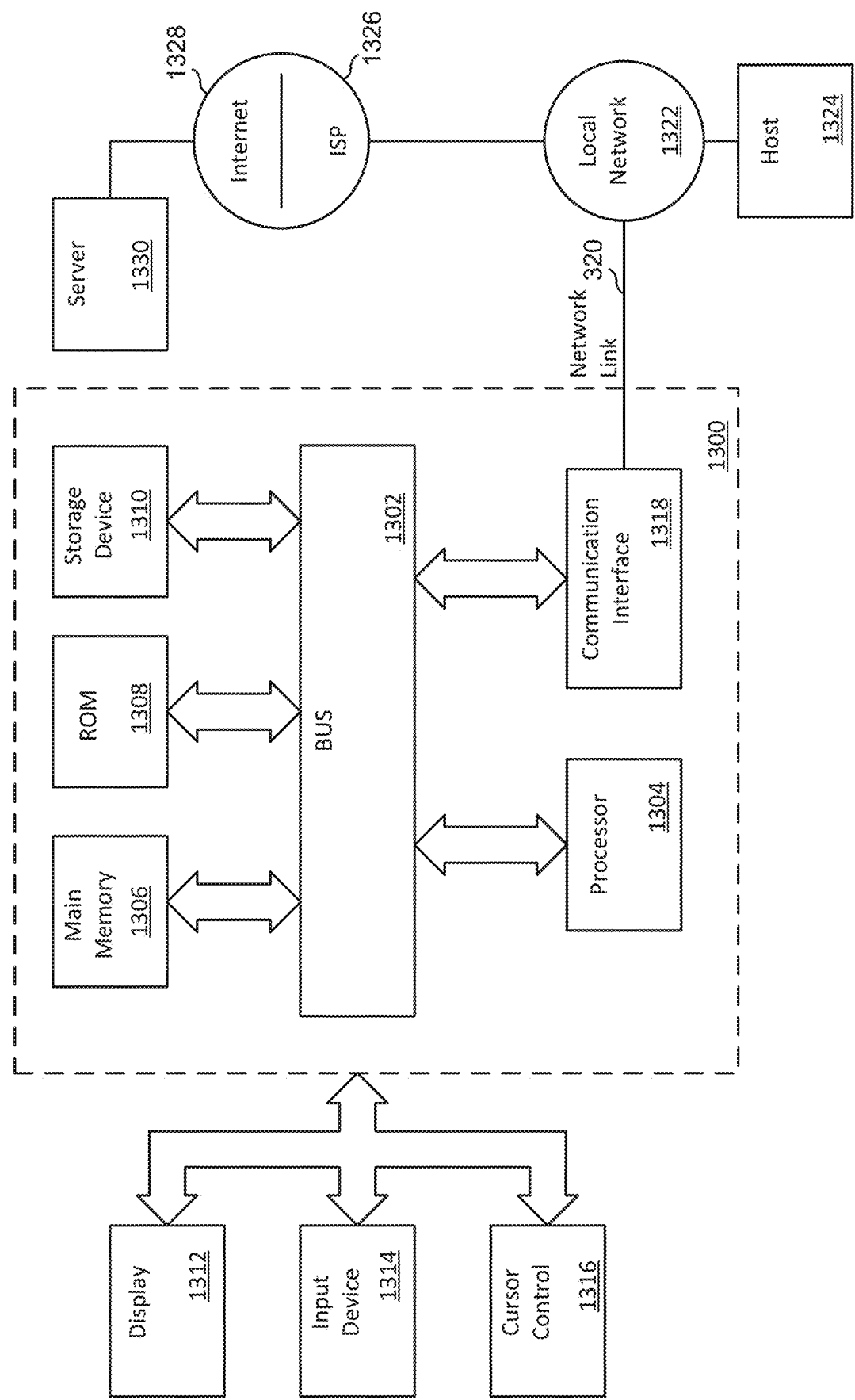
FIG. 13 is a block diagram illustrating an example computer system upon which computer systems of the systems illustrated in FIGS. 1-12 may be implemented.

The visual content generation system 1200 of FIG. 12 can be is configured to generate and process muscle models, facial rigs, and animator user interfaces described in relation to FIGS. 1-11 and may be implemented by software executing on one or more computer systems (e.g., each like a computer system 1300 illustrated in FIG. 13).

For example, FIG. 12 illustrates the example visual content generation system 1200 as might be used to generate imagery in the form of still images and/or video sequences of images. The visual content generation system 1200 might generate imagery of live action scenes, computer generated scenes, or a combination thereof. In a practical system, users are provided with tools that allow them to specify, at high levels and low levels where necessary, what is to go into that imagery. For example, a user might be an animation artist and might use the visual content generation system 1200 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by the visual content generation system 1200 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920 pixel columns by 1280 pixel rows Images might or might not be stored in a compressed format, but either way, a desired image may be represented as a two-dimensional array of pixel color values. In another variation, images are represented by a pair of stereo images for three-dimensional presentations and in other variations, some or all of an image output might represent three-dimensional imagery instead of just two-dimensional views.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for the purpose of clarity of description, in some examples, it is assumed that a video frame has one specified display time and it should be understood that other variations are possible.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 12, a live action capture system 1202 captures a live scene that plays out on a stage 1204. The live action capture system 1202 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 1206(1) and 1206(2) capture the scene, while in some systems, there might be other sensor(s) 1208 that capture information from the live scene (e.g., infrared cameras, infrared sensors, motion capture ("mo-cap") detectors, etc.). On the stage 1204, there might be human actors, animal actors, inanimate objects, background objects, and possibly an object such as a green screen 1210 that is designed to be captured in a live scene recording in such a way that it is easily overlaid with computer-generated imagery. The stage 1204 might also contain objects that serve as fiducials, such as fiducials 1212(1)-(3), that might be used post-capture to determine where an object was during capture. A live action scene might be illuminated by one or more lights, such as an overhead light 1214.

During or following the capture of a live action scene, the live action capture system 1202 might output live action footage to a live action footage storage 1220. A live action processing system 1222 might process live action footage to generate data about that live action footage and store that data into a live action metadata storage 1224. The live action processing system 1222 might include computer processing capabilities, image processing capabilities, one or more processors, program code storage for storing program instructions executable by the one or more processors, as well as user input devices and user output devices, not all of which are shown. The live action processing system 1222 might process live action footage to determine boundaries of objects in a frame or multiple frames, determine locations of objects in a live action scene, where a camera was relative to some action, distances between moving objects and fiducials, etc. Where elements are sensored or detected, the metadata might include location, color, and intensity of the overhead light 1214, as that might be useful in post-processing to match computer-generated lighting on objects that are computer-generated and overlaid on the live action footage. The live action processing system 1222 might operate autonomously, perhaps based on predetermined program instructions, to generate and output the live action metadata upon receiving and inputting the live action footage. The live action footage can be camera-captured data as well as data from other sensors.

An animation creation system 1230 is another part of the visual content generation system 1200. The animation creation system 1230 might include computer processing capabilities, image processing capabilities, one or more processors, program code storage for storing program instructions executable by the one or more processors, as well as user input devices and user output devices, not all of which are shown. The animation creation system 1230 might be used by animation artists, managers, and others to specify details, perhaps programmatically and/or interactively, of imagery to be generated. From user input and data from a database or other data source, indicated as a data store 1232, the animation creation system 1230 might generate and output data representing objects (e.g., a horse, a human, a ball, a teapot, a cloud, a light source, a texture, etc.) to an object storage 1234, generate and output data representing a scene into a scene description storage 1236, and/or generate and output data representing animation sequences to an animation sequence storage 1238.

Scene data might indicate locations of objects and other visual elements, values of their parameters, lighting, camera location, camera view plane, and other details that a rendering engine 1250 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

The animation creation system 1230 might be interactive, allowing a user to read in animation sequences, scene descriptions, object details, etc. and edit those, possibly returning them to storage to update or replace existing data. As an example, an operator might read in objects from object storage into a baking processor that would transform those objects into simpler forms and return those to the object storage 1234 as new or different objects. For example, an operator might read in an object that has dozens of specified parameters (movable joints, color options, textures, etc.), select some values for those parameters and then save a baked object that is a simplified object with now fixed values for those parameters.

Rather than have to specify each detail of a scene, data from the data store 1232 might be used to drive object presentation. For example, if an artist is creating an animation of a spaceship passing over the surface of the Earth, instead of manually drawing or specifying a coastline, the artist might specify that the animation creation system 1230 is to read data from the data store 1232 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 1244 might read in live action metadata, such as data representing movements and positions of body parts of a live actor during a live action scene, and generate corresponding animation parameters to be stored in the animation sequence storage 1238 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by the live action processing system 1222. The animation driver generator 1244 might convert that movement data into specifications of how joints of an articulated CGI character are to move over time.

A rendering engine 1250 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test a particular interaction or direction, while clarity might be more important that speed for a movie maker to generate data that will be used for final prints of feature films to be distributed. The rendering engine 1250 might include computer processing capabilities, image processing capabilities, one or more processors, program code storage for storing program instructions executable by the one or more processors, as well as user input devices and user output devices, not all of which are shown.

The visual content generation system 1200 can also include a merging system 1260 that merges live footage with animated content. The live footage might be obtained and input by reading from the live action footage storage 1220 to obtain live action footage, by reading from the live action metadata storage 1224 to obtain details such as presumed segmentation in captured images segmenting objects in a live action scene from their background (perhaps aided by the fact that the green screen 1210 was part of the live action scene), and by obtaining CGI imagery from the rendering engine 1250.

A merging system 1260 might also read data from a rulesets for merging/combining storage 1262. A very simple example of a rule in a ruleset might be "obtain a full image including a two-dimensional pixel array from live footage, obtain a full image including a two-dimensional pixel array from the rendering engine 1250, and output an image where each pixel is a corresponding pixel from the rendering engine 1250 when the corresponding pixel in the live footage is a specific color of green, otherwise output a pixel value from the corresponding pixel in the live footage."

The merging system 1260 might include computer processing capabilities, image processing capabilities, one or more processors, program code storage for storing program instructions executable by the one or more processors, as well as user input devices and user output devices, not all of which are shown. The merging system 1260 might operate autonomously, following programming instructions, or might have a user interface or programmatic interface over which an operator can control a merging process. In some embodiments, an operator can specify parameter values to use in a merging process and/or might specify specific tweaks to be made to an output of the merging system 1260, such as modifying boundaries of segmented objects, inserting blurs to smooth out imperfections, or adding other effects. Based on its inputs, the merging system 1260 can output an image to be stored in a static image storage 1270 and/or a sequence of images in the form of video to be stored in an animated/combined video storage 1272.

Thus, as described, the visual content generation system 1200 can be used to generate video that combines live action with computer-generated animation using various components and tools, some of which are described in more detail herein. While the visual content generation system 1200 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

For example, FIG. 13 is a block diagram that illustrates a computer system 1300 upon which the computer systems described herein and/or the visual content generation system 1200 (see FIG. 12) may be implemented. The computer system 1300 includes a bus 1302 or other communication mechanism for communicating information, and a processor 1304 coupled with the bus 1302 for processing information. The processor 1304 may be, for example, a general purpose microprocessor.

The computer system 1300 also includes a main memory 1306, such as a random access memory (RAM) or other dynamic storage device, coupled to the bus 1302 for storing information and instructions to be executed by the processor 1304. The main memory 1306 may also be used for storing temporary variables or other intermediate information during execution of instructions to be executed by the processor 1304. Such instructions, when stored in non-transitory storage media accessible to the processor 1304, render the computer system 1300 into a special-purpose machine that is customized to perform the operations specified in the instructions.

The computer system 1300 further includes a read only memory (ROM) 1308 or other static storage device coupled to the bus 1302 for storing static information and instructions for the processor 1304. A storage device 1310, such as a magnetic disk or optical disk, is provided and coupled to the bus 1302 for storing information and instructions.

The computer system 1300 may be coupled via the bus 1302 to a display 1312, such as a computer monitor, for displaying information to a computer user. An input device 1314, including alphanumeric and other keys, is coupled to the bus 1302 for communicating information and command selections to the processor 1304. Another type of user input device is a cursor control 1316, such as a mouse, a trackball, or cursor direction keys for communicating direction information and command selections to the processor 1304 and for controlling cursor movement on the display 1312. This input device typically has two degrees of freedom in two axes, a first axis (e.g., x) and a second axis (e.g., y), that allows the device to specify positions in a plane.

The computer system 1300 may implement the techniques described herein using customized hard-wired logic, one or more ASICs or FPGAs, firmware and/or program logic which in combination with the computer system causes or programs the computer system 1300 to be a special-purpose machine. According to one embodiment, the techniques herein are performed by the computer system 1300 in response to the processor 1304 executing one or more sequences of one or more instructions contained in the main memory 1306. Such instructions may be read into the main memory 1306 from another storage medium, such as the storage device 1310. Execution of the sequences of instructions contained in the main memory 1306 causes the processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as the storage device 1310. Volatile media includes dynamic memory, such as the main memory 1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include the bus 1302. Transmission media can also take the form of acoustic or light waves, such as those generated during radio-wave and infra-red data communications.

Various forms of media may be involved in carrying one or more sequences of one or more instructions to the processor 1304 for execution. For example, the instructions may initially be carried on a magnetic disk or solid state drive of a remote computer. The remote computer can load the instructions into its dynamic memory and send the instructions over a network connection. A modem or network interface local to the computer system 1300 can receive the data. The bus 1302 carries the data to the main memory 1306, from which the processor 1304 retrieves and executes the instructions. The instructions received by the main memory 1306 may optionally be stored on the storage device 1310 either before or after execution by the processor 1304.

The computer system 1300 also includes a communication interface 1318 coupled to the bus 1302. The communication interface 1318 provides a two-way data communication coupling to a network link 1320 that is connected to a local network 1322. For example, the communication interface 1318 may be an integrated services digital network (ISDN) card, cable modem, satellite modem, or a modem to provide a data communication connection to a corresponding type of telephone line. Wireless links may also be implemented. In any such implementation, the communication interface 1318 sends and receives electrical, electromagnetic, or optical signals that carry digital data streams representing various types of information.

The network link 1320 typically provides data communication through one or more networks to other data devices. For example, the network link 1320 may provide a connection through the local network 1322 to a host computer 1324 or to data equipment operated by an Internet Service Provider (ISP) 1326. The ISP 1326 in turn provides data communication services through the world wide packet data communication network now commonly referred to as the "Internet" 1328. The local network 1322 and Internet 1328 both use electrical, electromagnetic, or optical signals that carry digital data streams. The signals through the various networks and the signals on the network link 1320 and through the communication interface 1318, which carry the digital data to and from the computer system 1300, are example forms of transmission media.

The computer system 1300 can send messages and receive data, including program code, through the network(s), the network link 1320, and communication interface 1318. In the Internet example, a server 1330 might transmit a requested code for an application program through the Internet 1328, ISP 1326, local network 1322, and communication interface 1318. The received code may be executed by the processor 1304 as it is received, and/or stored in the storage device 1310, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C,"

unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for generating a bone surface depicting at least a portion of a skull of a live actor, the method comprising:
    obtaining a plurality of facial scans of the live actor, each facial scan including a respective skin surface and respective sensing data indicative of facial muscle strains corresponding to a set of facial muscles;
    obtaining, from a database, a tissue depth dataset including a tissue depth indicating a distance from a corresponding surface point on the human face to a skull surface underneath the human face;
    deriving a bone surface based on a skin surface generated from the plurality of facial scans and the tissue depth dataset;
    refining the bone surface based on a user input via a user interface; and
    refining the bone surface via a neural network by inputting to the neural network the plurality of facial scans and a tissue depth array from the tissue depth dataset, and using muscle or skin parameters derived from the plurality of facial scans as ground truth labels.

2. The method of claim 1, further comprising:
    determining, from the plurality of facial scans, the three-dimensional facial skin surface structure of the live actor by:
        determining, for a sampled point on the three-dimensional facial skin surface structure, a corresponding point on the bone surface based on a respective tissue depth corresponding to the sampled point; and
        determining the bone surface by interpolating a plurality of determined corresponding points on the bone surface.

3. The method of claim 1, further comprising:
    generating a muscle model from the plurality of the facial scans of the live actor, wherein the muscle model comprises a plurality of facial muscles and each facial muscle includes an attachment point to the skull; and
    refining the bone surface according to a set of attachment points indicated by the generated muscle model.

4. The method of claim 1, further comprising:
    receiving, via the user interface, the user input to modify the bone surface; and
    modifying the bone surface according to the user input.

5. The method of claim 1, wherein the tissue depth dataset is selected from a plurality of tissue depth datasets based on a known characteristic of the live actor.

6. The method of claim 5, wherein each dataset of the plurality of tissue depth datasets corresponds to any combination of following factors:
    race;
    age;
    gender;
    height;
    weight; and
    body mass index.

7. A system for generating a bone surface depicting at least a portion of a skull of a live actor, the system comprising:
    an input interface configured to obtain a plurality of facial scans of the live actor, each facial scan including a respective skin surface and respective sensing data indicative of facial muscle strains corresponding to a set of facial muscles;
    a communication interface configured to obtain, from a database, a tissue depth dataset including a tissue depth indicating a distance from a corresponding surface point on the human face to a skull surface underneath the human face;
    one or more processors configured to:
    derive a bone surface based on a skin surface generated from the plurality of facial scans and the tissue depth dataset;
    refine the bone surface based on a user input via a user interface; and
    refine the bone surface via a neural network by inputting to the neural network the plurality of facial scans and a tissue depth array from the tissue depth dataset, and using muscle or skin parameters derived from the plurality of facial scans as ground truth labels.

8. The system of claim 7, wherein the one or more processors are further configured to determine, from the plurality of facial scans, the three-dimensional facial skin surface structure of the live actor by:
 determining, for a sampled point on the three-dimensional facial skin surface structure, a corresponding point on the bone surface based on a respective tissue depth corresponding to the sampled point;
 determining the bone surface by interpolating a plurality of determined corresponding points on the bone surface.

9. The system of claim 7, wherein the one or more processors are further configured to:
 generate a muscle model from the plurality of the facial scans of the live actor, wherein the muscle model comprises a plurality of facial muscles and each facial muscle includes an attachment point to the skull; and
 refine the bone surface according to a set of attachment points indicated by the generated muscle model.

10. The system of claim 7, wherein the one or more processors are further configured to:
 receive, via the user interface, the user input to modify the bone surface; and
 modify the bone surface according to the user input.

11. The system of claim 8, wherein the tissue depth dataset is selected from a plurality of tissue depth datasets based on a known characteristic of the live actor.

12. The system of claim 11, wherein each dataset of the plurality of tissue depth datasets corresponds to any combination of following factors:
 race;
 age;
 gender;
 height;
 weight; and
 body mass index.

13. A computer-readable non-transitory medium storing computer-executable instructions for generating a bone surface depicting at least a portion of a skull of a live actor, the computer-executable instructions being executed by one or more processors to perform operations comprising:
 obtaining a plurality of facial scans of the live actor, each facial scan including a respective skin surface and respective sensing data indicative of facial muscle strains corresponding to a set of facial muscles;
 obtaining, from a database, a tissue depth dataset including a tissue depth indicating a distance from a corresponding surface point on the human face to a skull surface underneath the human face;
 deriving a bone surface based on a skin surface generated from the plurality of facial scans and the tissue depth dataset;
 refining the bone surface based on a user input via a user interface; and
 refining the bone surface via a neural network by inputting to the neural network the plurality of facial scans and a tissue depth array from the tissue depth dataset, and using muscle or skin parameters derived from the plurality of facial scans as ground truth labels.

14. The computer-readable non-transitory medium of claim 13, further comprising an operation of determining, from the plurality of facial scans, the three-dimensional facial skin surface structure of the live actor that comprises:
 determining, for a sampled point on the three-dimensional facial skin surface structure, a corresponding point on the bone surface based on a respective tissue depth corresponding to the sampled point;
 determining the bone surface by interpolating a plurality of determined corresponding points on the bone surface.

15. The computer-readable non-transitory medium of claim 13, wherein the operations further comprise:
 generating a muscle model from the plurality of the facial scans of the live actor, wherein the muscle model comprises a plurality of facial muscles and each facial muscle includes an attachment point to the skull; and
 refining the bone surface according to a set of attachment points indicated by the generated muscle model.

16. The computer-readable non-transitory medium of claim 13, wherein the tissue depth dataset is selected from a plurality of tissue depth datasets based on a known characteristic of the live actor.

17. The computer-readable non-transitory medium of claim 13, wherein each dataset of the plurality of tissue depth datasets corresponds to any combination of following factors:
 race;
 age;
 gender;
 height;
 weight; and
 body mass index.

* * * * *